(12) United States Patent
Fullerton et al.

(10) Patent No.: US 8,905,186 B2
(45) Date of Patent: Dec. 9, 2014

(54) SYSTEM FOR COUPLING AN OVERPRESSURE WAVE TO A TARGET MEDIA

(71) Applicant: Soundblast Technologies, LLC, Winter Park, FL (US)

(72) Inventors: Larry W. Fullerton, New Hope, AL (US); James L. Teel, Winter Park, FL (US); Herman M. Thompson, Jr., Kelso, TN (US)

(73) Assignee: Soundblast Technologies, LLC, Winter Park, FL (US)

( * ) Notice: Subject to any disclaimer, the term of this patent is extended or adjusted under 35 U.S.C. 154(b) by 0 days.

(21) Appl. No.: 13/669,985

(22) Filed: Nov. 6, 2012

(65) Prior Publication Data

US 2013/0118828 A1    May 16, 2013

Related U.S. Application Data

(63) Continuation-in-part of application No. 13/049,386, filed on Mar. 16, 2011, now Pat. No. 8,302,730, which is a continuation-in-part of application No. 11/785,327, filed on Apr. 17, 2007, now Pat. No. 8,292,022.

(60) Provisional application No. 60/792,420, filed on Apr. 17, 2006, provisional application No. 60/850,685, filed on Oct. 10, 2006, provisional application No. 61/744,237, filed on Sep. 21, 2012, provisional application No. 61/795,049, filed on Oct. 9, 2012, provisional application No. 61/340,358, filed on Mar. 16, 2010.

(51) Int. Cl.
*G01V 1/00* (2006.01)

(52) U.S. Cl.
USPC .................................................. 181/101

(58) Field of Classification Search
USPC .................................................. 181/101
See application file for complete search history.

(56) References Cited

U.S. PATENT DOCUMENTS

| 2,994,397 A | 8/1961 | Huckabay et al. |
| 3,048,816 A | 8/1962 | Lubnow |

(Continued)

FOREIGN PATENT DOCUMENTS

| GB | 934 749 | 8/1963 |
| GB | 1 269 123 | 4/1972 |

(Continued)

OTHER PUBLICATIONS

International Search Report dated Apr. 24, 2008 Issued in International Application No. PCT/US2007/09441.

(Continued)

*Primary Examiner* — Forrest M Phillips
(74) *Attorney, Agent, or Firm* — Venable LLP; Robert S. Babayi

(57) ABSTRACT

An improved system for coupling a generated overpressure wave to a target media includes a coupling chamber and an interface between the coupling chamber and a target media. Pressure produced in the coupling chamber by a generated overpressure wave is applied to the interface thereby converting the pressure in the coupling chamber into a force that produces a conducted acoustic wave in the target media.

23 Claims, 34 Drawing Sheets

(56) References Cited

U.S. PATENT DOCUMENTS

| | | | |
|---|---|---|---|
| 3,064,753 A | | 11/1962 | McClure |
| 3,099,813 A | | 7/1963 | Anderson |
| 3,233,694 A | | 2/1966 | Roever |
| 3,235,026 A | | 2/1966 | Hottman |
| 3,410,142 A | | 11/1968 | Diaber et al. |
| 3,412,394 A | | 11/1968 | Lewis et al. |
| 3,746,120 A | * | 7/1973 | Kilmer ............. 181/117 |
| 3,828,886 A | | 8/1974 | Holloway |
| 3,897,195 A | | 7/1975 | Finch |
| 4,043,420 A | * | 8/1977 | Zens et al. ............. 181/117 |
| 4,189,026 A | | 2/1980 | Elliot et al. |
| 4,356,753 A | | 11/1982 | Galley |
| 4,642,611 A | | 2/1987 | Koerner |
| 4,662,844 A | | 5/1987 | Gallagher et al. |
| 4,664,631 A | | 5/1987 | Pederson et al. |
| 4,741,154 A | | 5/1988 | Eidelman |
| 5,345,758 A | | 9/1994 | Bussing |
| 5,430,691 A | | 7/1995 | Fridman |
| 5,473,885 A | | 12/1995 | Hunter, Jr. et al. |
| 5,513,489 A | | 5/1996 | Bussing |
| 5,579,633 A | | 12/1996 | Hunter, Jr. et al. |
| 5,644,314 A | | 7/1997 | Ahmad et al. |
| 5,800,153 A | | 9/1998 | DeRoche |
| 5,855,827 A | | 1/1999 | Bussing et al. |
| 5,864,517 A | | 1/1999 | Hinkey et al. |
| 5,873,240 A | | 2/1999 | Bussing et al. |
| 5,937,635 A | | 8/1999 | Winfree et al. |
| 5,973,999 A | | 10/1999 | Naff et al. |
| 6,003,301 A | | 12/1999 | Bratkovich et al. |
| 6,062,018 A | | 5/2000 | Bussing |
| 6,360,173 B1 | | 3/2002 | Fullerton |
| 6,408,614 B1 | | 6/2002 | Eizenhofer |
| 6,813,878 B2 | | 11/2004 | Kraft |
| 6,928,804 B2 | | 8/2005 | Venkataramani et al. |
| 7,007,455 B2 | | 3/2006 | Kraft |
| 7,093,794 B2 | | 8/2006 | Leyva et al. |
| 7,100,377 B2 | | 9/2006 | Kraft |
| 7,797,110 B2 | | 9/2010 | Shin |
| 7,841,982 B2 | | 11/2010 | Johnson et al. |
| 7,882,926 B2 | * | 2/2011 | Fullerton ............. 181/117 |
| 7,944,774 B2 | | 5/2011 | Monk et al. |
| 2005/0103022 A1 | | 5/2005 | Kraft |
| 2005/0125933 A1 | | 6/2005 | Hochstein, Jr. et al. |
| 2007/0199382 A1 | | 8/2007 | Sakai |

FOREIGN PATENT DOCUMENTS

| | | |
|---|---|---|
| JP | 59-56023 | 4/1984 |
| RU | 2 084 675 C1 | 7/1997 |
| RU | 2 130 597 C1 | 5/1999 |
| RU | 2 188 084 C2 | 8/2002 |
| RU | 36135 | 2/2004 |
| SU | 1716253 A1 | 2/1992 |
| WO | WO-94/22559 | 10/1994 |
| WO | WO-99/09355 A1 | 2/1999 |
| WO | WO-99/17071 A2 | 4/1999 |

OTHER PUBLICATIONS

International Search Report dated Sep. 10, 2008 issued in PCT/US07/09442.

International Search Report dated Sep. 10, 2008, issued in related International Appln. No. PCT/US07/09444.

Kelly, J., "After Combustion: Detonation," Popular Science, Sep. 2003.

Lu, F.K. et al., "Experimental study of a pulse detonation rocket with Shchelkin spiral," Aerodynamics Research Center, University of Texas at Arlington, TX 76019, USA, pp. 1-6.

Nicholls, J.A. et al., "Intermittent detonation as a thrust-producing mechanism," Engineering Research Institute, University of Michigan, Jan. 1954.

Notification of Transmittal of the International Search Report and the Written Opinion of the International Searching Authority, or the Declaration dated Sep. 10, 2008.

Office Action dated Aug. 4, 2011, issued in related U.S. Appl. No. 13/015,876.

Office Action dated Jul. 27, 2011, issued in related U.S. Appl. No. 11/785,327.

Office Action dated Mar. 29, 2010, issued in related U.S. Appl. No. 11/785,320.

Russian Decision on Grant dated Jun. 15, 2011, issued in related Russian Patent Application No. 2008145048/07(058826), and an English-language translation.

Russian Decision on Grant received Jul. 29, 2011, issued in related Russian Patent Application No. 2008145045/07(058823), and an English-language translation.

Van Wingerden, K. et al., "Detonations in pipes and in the open," Christian Michelsen Research, Bergen, Norway, Nov. 1999.

Written Opinion of the International Searching Authority dated Apr. 24, 2008, Issued in International Application No. PCT/US2007/09441.

Written Opinion of the International Searching Authority dated Sep. 10, 2008 issued in PCT/US07/09442.

Written Opinion of the International Searching Authority dated Sep. 10, 2008, issued in related International Appln. No. PCT/US07/09444.

Supplementary European Search Report of EP 07 86 7081 dated Jan. 9, 2012.

Office Action issued from the Canadian Intellectual Property Office issued in counterpart Canadian Application No. 2,648,871 dated Dec. 17, 2012.

\* cited by examiner

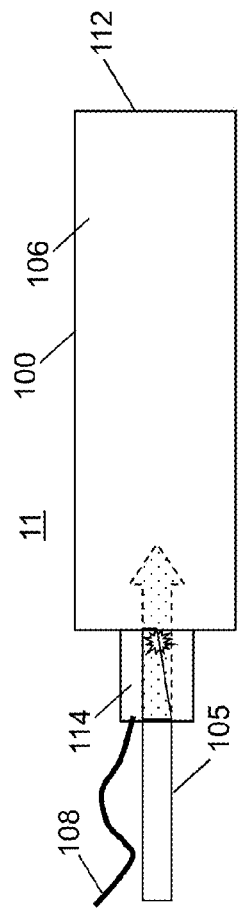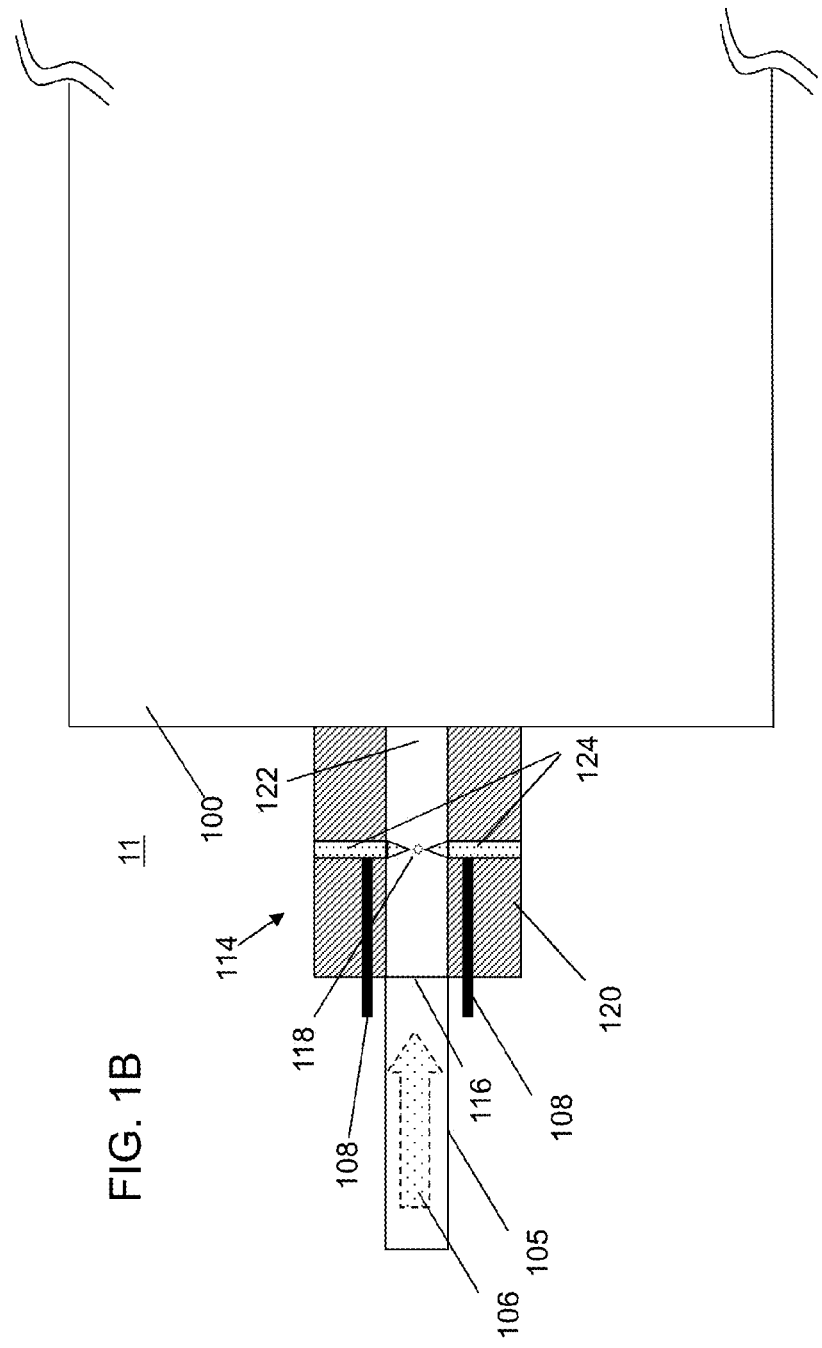

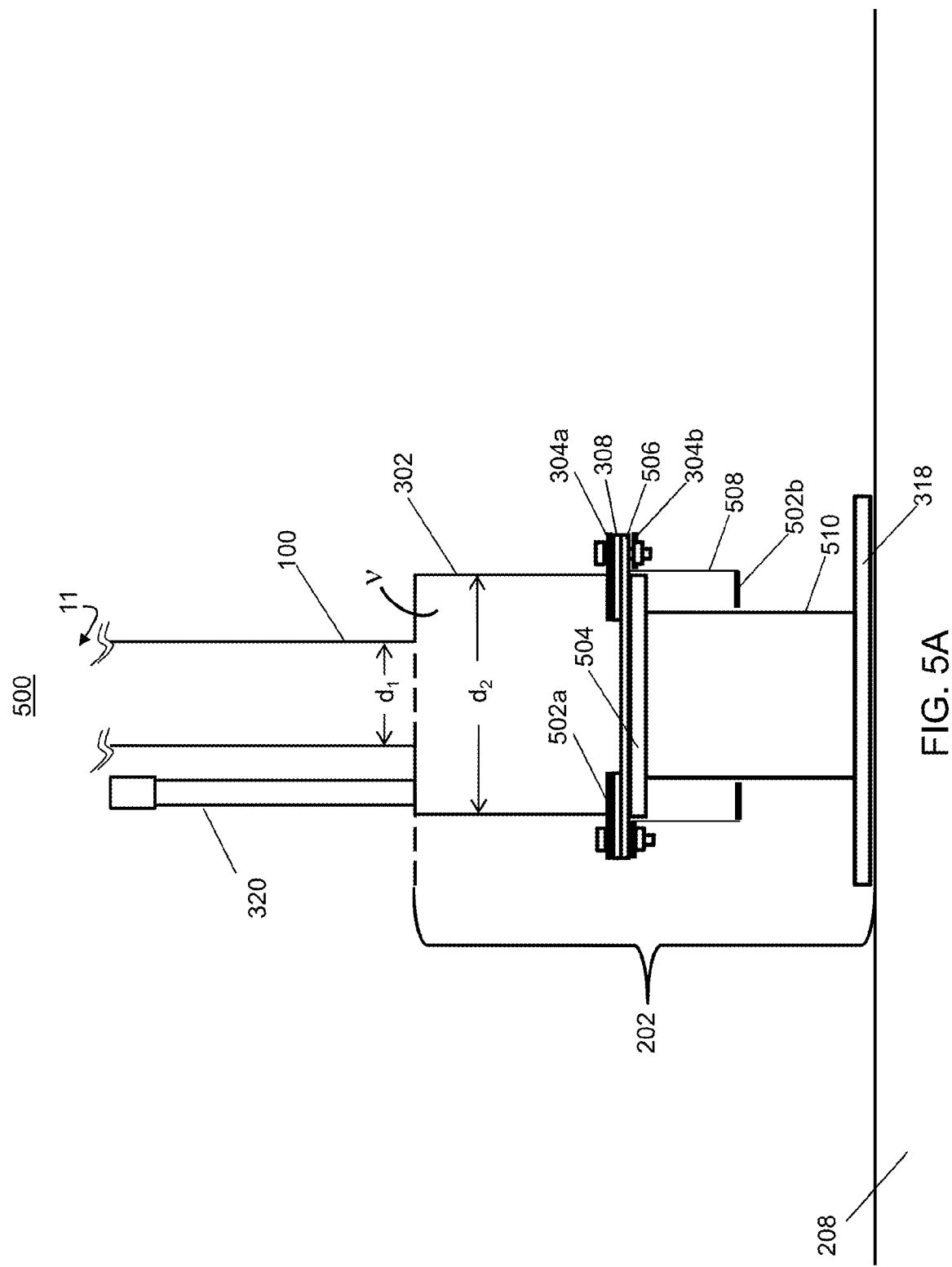

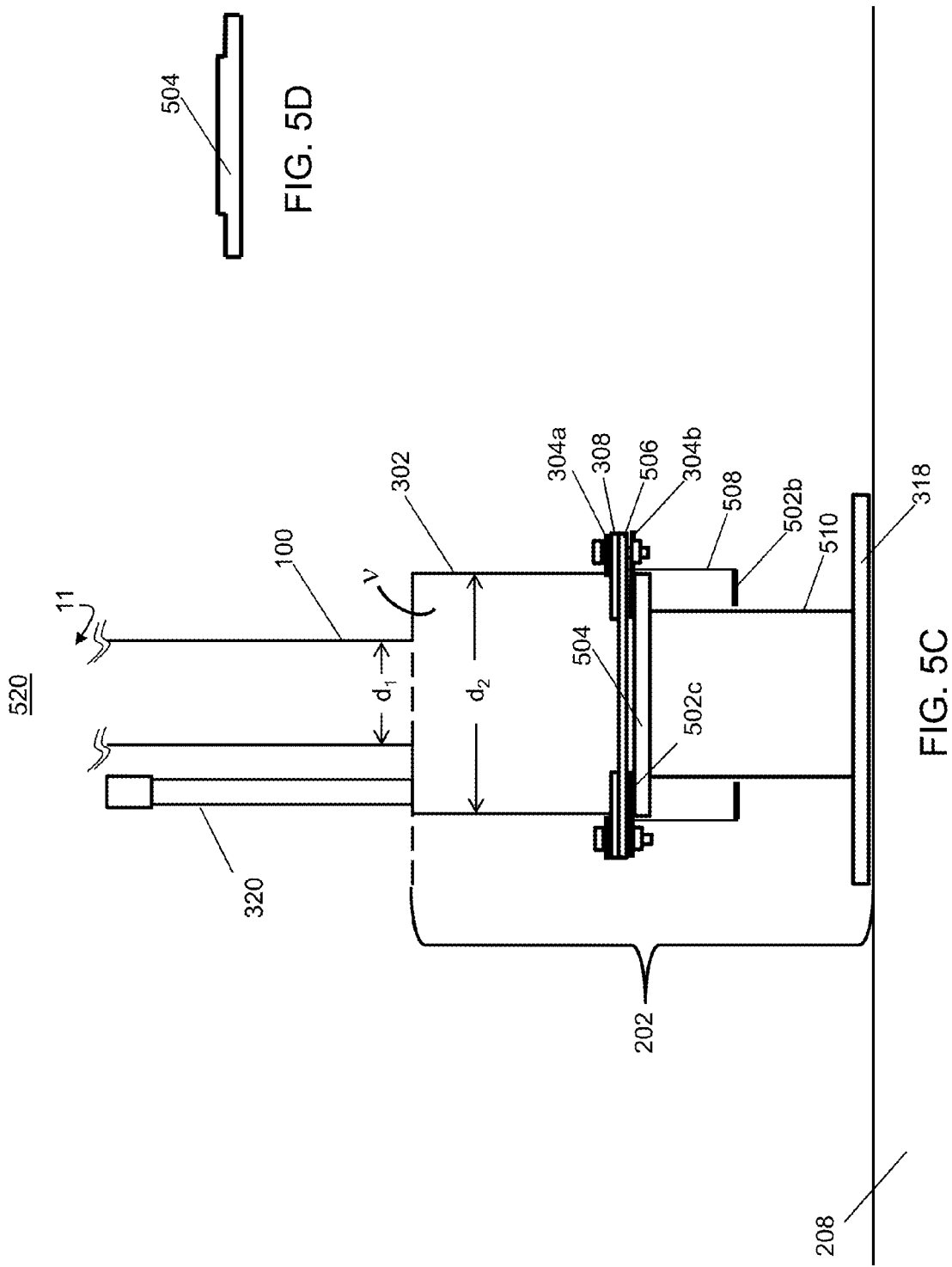

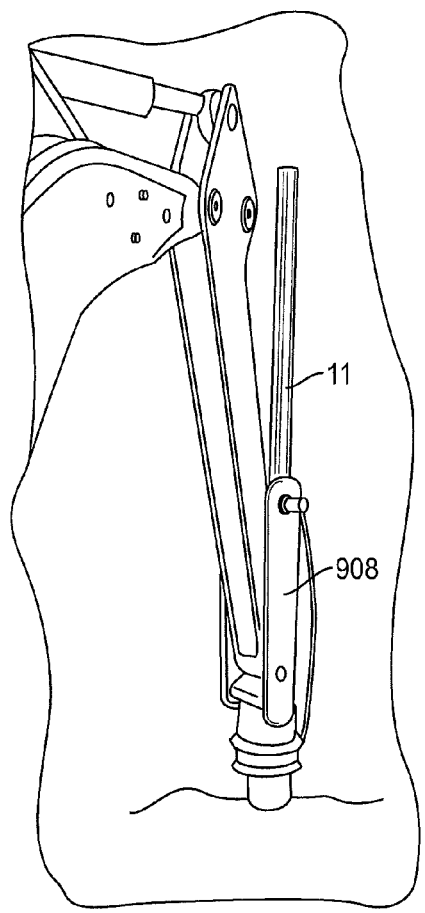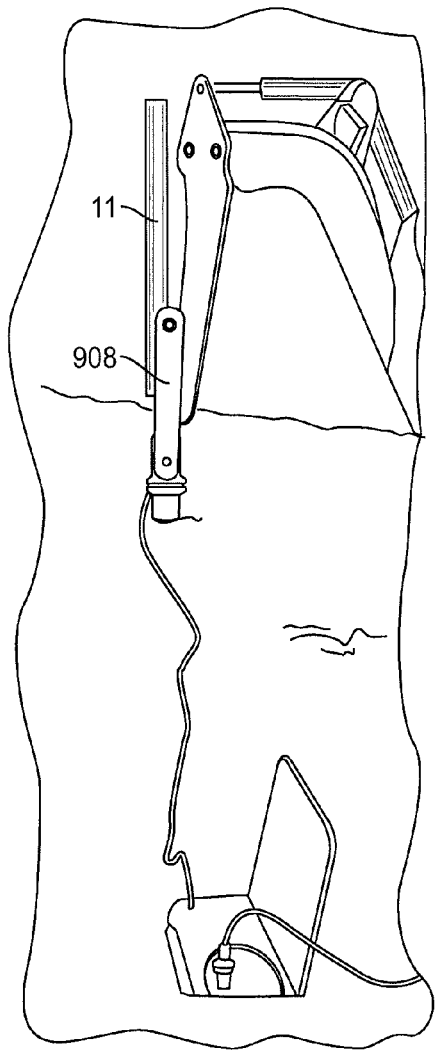
FIG. 17
FIG. 18

SYSTEM FOR COUPLING AN OVERPRESSURE WAVE TO A TARGET MEDIA

CROSS REFERENCE TO RELATED APPLICATIONS

This U.S. Application is a Continuation-in-Part Application of pending U.S. Non-Provisional application Ser. No. 13/049,386, filed Mar. 16, 2011, which claims priority to U.S. Provisional Application 61/340,358, filed Mar. 16, 2010 and which is a Continuation-in-Part Application of U.S. Pat. No. 8,292,022, issued Oct. 23, 2012, which claims priority to U.S. Provisional Patent Application 60/792,420, filed Apr. 17, 2006, and U.S. Provisional Patent Application 60/850,685, filed Oct. 10, 2006, all of which are incorporated herein by reference. This application also claims priority to U.S. Provisional Patent Application 61/744,237, filed Sep. 21, 2012, titled "System and Method for Coupling an Overpressure Wave to a Target Media" and to U.S. Provisional Patent Application filed Oct. 9, 2012, titled "System and Method for Constraining Movement of an Overpressure Wave Generator", which are both incorporated herein by reference in their entirety.

FIELD OF THE INVENTION

The present invention relates generally to a system for coupling an overpressure wave to a target media. More particularly, the present invention relates to a system and method for coupling an overpressure wave to a target media using a coupling component comprising a coupling chamber and an interface that directly contacts the target media, where a pressure of a generated overpressure wave produced in the coupling chamber is applied to the interface thereby converting the pressure into a unidirectional force that produces a conducted acoustic wave in the target media.

SUMMARY OF THE INVENTION

In accordance with one embodiment of the invention, an overpressure wave generation system includes a detonator, a coupling chamber, and an interface between said coupling chamber and a target media. The detonator causes a detonation that generates an overpressure wave that travels into the coupling chamber, the coupling chamber being substantially sealed when said overpressure wave is generated thereby containing a pressure produced by said overpressure wave, the interface converting said pressure into a force that produces a conducted acoustic wave in the target media.

The overpressure wave generation system may also include a detonation tube between the detonator and said coupling chamber where the overpressure wave travels through the detonation tube and then into the coupling chamber.

The detonation tube may have a first diameter and the coupling chamber may have a second diameter, where the first diameter can be greater than or less than the second diameter.

The interface may include an earth plate.

The interface may include a cylinder that is attached to the coupling chamber and a piston located inside the cylinder and positioned against the earth plate, where the piston and the cylinder are configured to substantially provide a seal to contain the pressure in the coupling chamber.

The interface may include a flexible membrane that provides a seal to contain the pressure in the coupling chamber, a top plate, a movement constraining vessel having a lower inner flange, and a piston rod located inside the movement constraining vessel and positioned between the top plate and the earth plate, the overpressure wave applying a pressure to the flexible membrane that is converted into the force, the force being applied to the target media via the top plate, the piston rod, and the earth plate, the movement constraining vessel constraining movement such that the top plate can only move between the lower inner flange and the flexible membrane.

The movement constraining vessel can have an upper inner flange such that the top plate can only move between said lower inner flange and said upper inner flange.

The coupling chamber can be made of one of titanium, aluminum, or a composite material.

The coupling chamber can be made of steel.

The coupling chamber can have a round shape.

The coupling chamber can have a lower outer flange and the cylinder can have upper and lower outer flanges.

A sealing component can be between the outer flange of the coupling chamber and the upper outer flange of the cylinder.

The coupling chamber and cylinder can be a single component.

The system may include at least one of a vent pipe, a nozzle, a muffler, or a restrictor.

The overpressure wave generation system may include a vehicle for constraining movement of the overpressure wave generation system, where the vehicle can be attached to said overpressure wave generation system.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIGS. 1A and 1B depict an exemplary overpressure wave generator;

FIGS. 5A-5C depicts exemplary coupling components that includes a coupling chamber, a flexible membrane, and a push plate assembly comprising a top plate, a piston rod, and an earth plate;

FIG. 5D depicts an alternative top plate for use with the coupling components of FIGS. 5B and 5C;

FIGS. 17 and 18 depict two different views of the overpressure wave generator attached to the arm of a backhoe;

DETAILED DESCRIPTION OF THE INVENTION

Figure 2:
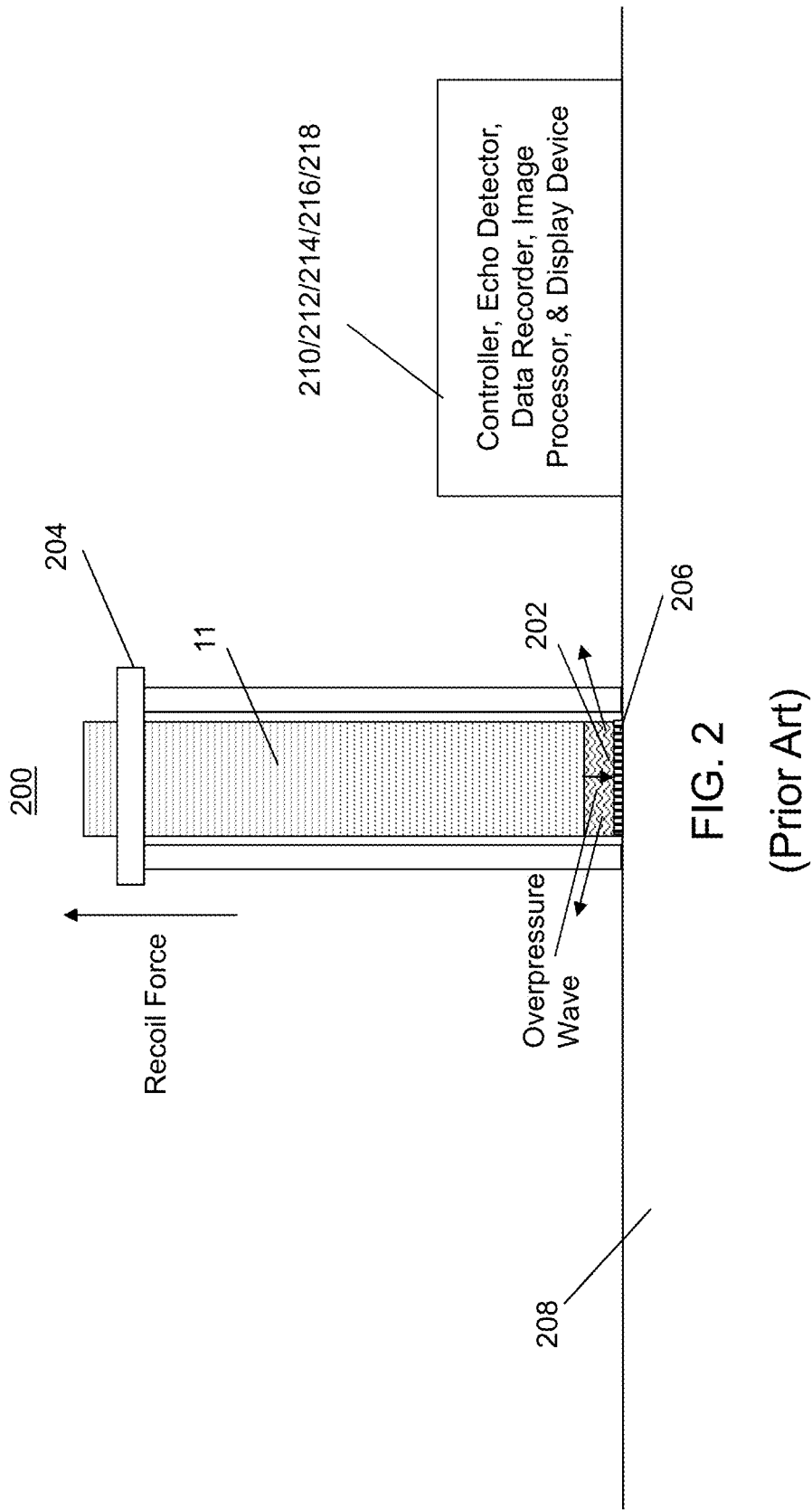
FIG. 2 depicts an exemplary seismic exploration system.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in the art.

Certain described embodiments may relate, by way of example but not limitation, to systems and/or apparatuses comprising overpressure wave generators, methods for using overpressure wave generators, and so forth. Example realizations for such embodiments may be facilitated, at least in part, by the use of an emerging, revolutionary overpressure wave generation technology that may be termed direct detonation overpressure wave generation that enables precision timing and amplitude control of detonations and corresponding generated overpressure waves. Alternatively, the technology may be called instantaneous detonation or any other such terminology indicative that detonation is achieved without deflagration, or in other words, without a deflagration to detonation transition (DDT) process. Direct detonation technology was first fully described and enabled in the co-assigned U.S. Pat. No. 7,883,926 issued on Feb. 8, 2011 and entitled "System and Method for Generating and Directing Very Loud Sounds", the co-assigned U.S. Pat. No. 7,886,866 issued on Feb. 15, 2011 and entitled "System and Method for Ignition of a Gaseous or Dispersed Fuel-oxidant Mixture", and the allowed co-assigned U.S. patent application Ser. No. 11/785,327, filed Apr. 17, 2007 and entitled "System and Method for Generating and Controlling Conducted Acoustic Wave for Geophysical Exploration". The contents of these documents are hereby incorporated herein by reference. A second generation of a direct detonation overpressure wave technology is described and enabled in the allowed co-assigned U.S. patent application Ser. No. 13/049,386 on Mar. 15, 2011, and entitled "System and Method for Generating and Controlling Conducted Acoustic Wave for Geophysical Exploration". The contents of this document are hereby incorporated herein by reference.

The present invention pertains to a system for coupling an overpressure wave to a target media using a coupling chamber and a push plate assembly and an optional piston. In a first embodiment, a non-flexible piston moveable within a cylinder is adjacent to the coupling chamber, where the piston has piston rings or some other sealing mechanism for providing a substantial seal between the piston and the cylinder. When an overpressure wave is generated, the pressure in the coupling chamber is applied to the piston, which pushes on a push plate assembly that is in direct contact with the target media, where the area (e,g., sq in) of the surface of the piston to which pressure is applied multiplied by the pressure (psi) in the coupling chamber corresponds to the force produced and conducting into the target media as an acoustic wave and the area of the push plate in contact with the target media determines the distribution of the produced force into the target media, where the area can be determined to correspond to a desired earth psi. The push plate assembly may be an earth plate shaped like a disc, may have a different shape, or comprise multiple attached components, for example, two plates attached by a piston rod. Under one arrangement, as the piston moves downward exhaust is able to escape via exhaust vent holes that are closed by the piston prior to its downward movement, where the shape of the exhaust vent holes can be configured to tailor the exhaust rate.

In a second embodiment of the invention, the coupling component comprises a coupling chamber and a push plate assembly, which is an earth plate that is directly in contact with the target media. The pressure produced in the coupling chamber is applied directly the push plate assembly.

In a third embodiment, the coupling component also comprises a coupling chamber, a flexible membrane, and a push plate assembly except the push plate assembly comprises a top plate that is attached to a piston rod that is attaché to a bottom plate that is directly in contact with the target media. The top plate and piston rod are movable within a movement constraining vessel. For either the second or third embodiment, the amount of area (sq in) of the flexible membrane that is in contact with the push plate assembly multiplied by the pressure (psi) produced in the coupling chamber determines the force produced and conducted into the target media as an acoustic wave.

In accordance with one aspect of the invention, all exhaust gas is forced out one or more exhaust gas escape outlets, where there could be one, two or more exhaust gas escape outlets. A gas escape outlet may include a nozzle to provide a negative thrust. A gas escape outlet may include a muffler. A gas escape outlet may include one or more restrictors for tuning the impulse recover rate of the overpressure wave generator. The recovery rate may be slow to enable low frequency seismic exploration or may be fast for high frequency applications or can be anywhere in between. The restrictors can be tuned to control the amount of the impact of the recoiling overpressure wave generator to eliminate any seismic echo.

In accordance with a fourth embodiment of the invention, at least one wheeled vehicle such as a backhoe tractor can be used to provide a mass to an overpressure wave generator to constrain its movement during generation of overpressure waves. A wheeled vehicle must have at least one component that can be placed in contact with the overpressure wave generator such that the mass of the wheeled vehicle provides a downward force on the overpressure wave generator to oppose the recoil force that is produced during generation of overpressure waves. The at least one component may be moveable such as the front loader, rear bucket, or rear arm, e.g., with rear bucket removed, of a backhoe or the at least one component may be fixed, such as a metal component extending from a vehicle. The wheeled vehicle may be configurable to conform to terrain so as to provide stability to the overpressure wave generator. For example, horizontal stabilizers can be used to provide support to the vehicle. Under one arrangement, one or more components of the wheeled vehicle are used to lift the vehicle so as to apply a substantial portion of the weight of the vehicle to the overpressure wave generator. For example, the front loader can be used to lift a backhoe such that the mass of backhoe is conveyed to the rear arm of the backhoe resting on the overpressure wave generator.

Under one arrangement, the at least one component (e.g., the backhoe arm) is attached to the overpressure wave generator, for example, using bosses and pins between the bosses, enabling the at least one component to maneuver the overpressure wave generator, which may include lifting, tilting, or otherwise orienting the overpressure wave generator relative to the target media. As such, the at least one component can be used to aim a generated overpressure wave. The at least one component may be rigidly attached or be attached in such a manner that the at least one component can pivot or otherwise move relative to the overpressure wave generator within at least one degree of freedom. Under one arrangement the at least one component would have the ability to move with six degrees of freedom relative to the overpressure wave generator.

Direct Detonation Overpressure Wave Generator Background

FIGS. 1A and 1B depict an exemplary direct detonation overpressure wave generator.

FIG. 1A depicts a detonation tube 100 of an overpressure wave generator 11 being supplied by fuel-oxidant mixture supply 105 via a detonator 114, where a spark ignites within the fuel-oxidant mixture 106 while the detonation tube 100 is being filed with the fuel-oxidant mixture 106 instantly causing detonation at the point of ignition that causes a detonation wave to propagate down the length of the detonation tube 100 and exit its open end 112.

As shown in 1B, the detonator 114 comprises an insulating cylinder 120 surrounding a detonator tube 122. Electrodes 124 are inserted from the sides of insulating cylinder 120 and are connected to high voltage wire 108. The detonator tube 122 is connected to fuel-oxidant mixture supply 105 (shown in FIG. 3B) at a fill point 116 and to a detonation tube 100 at its opposite end. As shown in FIG. 1B, a gas mixture 106 is passed into the detonator tube 122 and then into the detonation tube 100 via a fill point 116 of the detonator 114. When the detonation tube 100 is essentially full, high voltage wire 108 is triggered to cause a spark 118 to occur across electrodes 124 and to pass through the gas mixture 106 flowing into detonator tube 122 to initiate detonation of the gas in the detonation tube 100.

FIG. 2 depicts an exemplary seismic exploration system 200 that includes an overpressure wave generator 11, a coupling component 202, a stabilizing mechanism 204 for controlling the movement of the overpressure wave generator, a controller 210 for controlling the operation of the overpressure wave generator 11, an echo detector 212, a data recorder 214, an image processor 216, and a display device 218. The open end of the overpressure wave generator 11 is configured such that generated overpressure waves are directed towards a target media 208. It should be understood that while the foregoing elements of the system 200 are identified separately, these elements do not necessarily have to be physically separated and can be configured in various alternative ways.

The exemplary overpressure wave generator 11 of system 200 includes a source for producing a spark, a detonation tube, a gas mixture source that provides the flowing gas into the detonation tube, and a detonator. The overpressure wave generator can alternatively comprise a group of detonation tubes that are detonated simultaneously so as to produce a combined overpressure wave. The system 200 can be implemented using one or more nozzles so as to more closely match the impedance of the detonation wave generated by the overpressure wave generator to the impedance of the ambient environment, e.g., the air, thereby reducing the reflection of energy back into the overpressure wave generator, increasing the strength of the overpressure wave that is generated, increasing the resulting force produced by the overpressure wave, and resulting in stronger conducted acoustic waves.

The overpressure wave generator is detonated to generate an overpressure wave. The force of the generated overpressure is coupled by coupling component 202 to a target media 208 such as the ground, ice, or water to produce a conducted acoustic wave. Stabilizing mechanism 204 provides stability to the movement of the overpressure wave generator 11 essentially allowing only up and down movement or substantially preventing movement altogether.

Coupling component 202 may comprise air, a liquid, a spring or may comprise rubber or some comparable compound having desired spring-like and damping characteristics, such as opposing polarity magnets. Coupling component 202 may optionally comprise an impedance transition device 206 as described previously, which directly contacts the target media 208 to impart the conducted acoustic wave. Impedance transition device 206 can have any of various types of shapes. In an exemplary embodiment, the impedance transition device 206 has a flat round shape. Under one arrangement, the impedance transition device 206 of the coupling component 202 corresponds to one or more surfaces of the coupling component 202 and, therefore, is not a separate device.

Whereas the coupling component of FIG. 2 has spring-like and damping characteristics and may include an impedance transition device, the coupling component of the present invention does not and instead comprises a coupling chamber and a push plate assembly that is in contact with a target media. The coupling chamber is substantially sealed at the moment of detonation and the pressure produced in the coupling chamber by a generated overpressure wave is applied to push plate assembly directly or via a piston thereby converting the pressure into a force thereby producing a conducted acoustic wave into the target media.

A Coupling Component Including a Coupling Chamber

Figure 3:
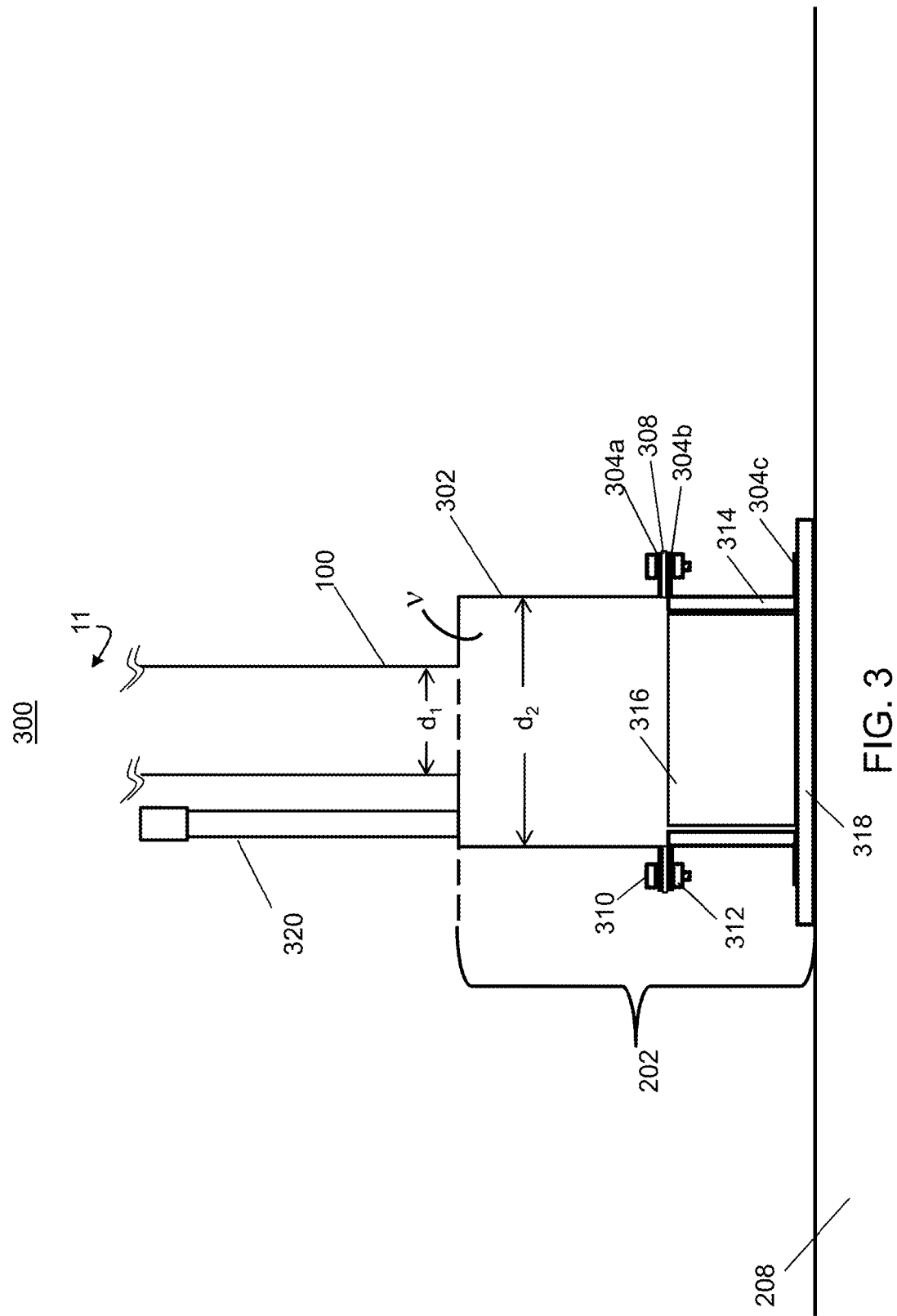
FIG. 3 depicts an exemplary coupling component that includes a coupling chamber a cylinder, a piston, and an earth plate.

FIG. 3 depicts an overpressure wave generator in accordance with a first embodiment of the invention. A detonation tube 100 of an overpressure wave generator 11 is attached to a coupling component 202. The detonation tube 100 is oriented to direct a generated overpressure wave towards a target media 208. The coupling component 202 includes a coupling chamber 302, a cylinder 314, a piston 316, and a push plate assembly comprising an earth plate 318. In a preferred embodiment, these components can be made of a rigid low mass substance such as titanium, aluminum, or composite materials such as carbon composite or fiber glass. Alternatively, such components can be made of steel.

The detonation tube 100 can have a first diameter $d_1$ and the coupling chamber 302 can have a second diameter $d_2$, where the diameter $d_2$ can be less than or greater than the first diameter $d_1$. Alternatively, the coupling chamber could have the same diameter as the detonation tube, which could be alternatively described as a detonation tube that also functions as a coupling chamber, or vice versa. In other words, one embodiment of the invention includes a detonator that generates an overpressure wave that travels directly into a coupling chamber, which also functions as a detonation tube. The coupling chamber can also have a varying diameter and can have a shape other than a round shape, for example, an oval shape, or rectangular shape, or any other desired shape. The coupling chamber has a volume, v, in which a peak pressure is produced when the overpressure wave is generated, where the volume for a round coupling chamber is a function of its height and diameter. Overall, the diameters d1 and d2 and volume v can be selected to have a desired pressure ratio between the pressure in the detonation tube 100 and the pressure in the coupling chamber 302. For example, the pressure in the detonation tube might be on the order of 500 psi while the pressure in the coupling chamber might be on the order of 130 psi.

The coupling chamber 302 may include an outer flange 304a. The cylinder 314 may include a top outer flange 304b and may include a lower outer flange 304c. A rubber or comparable sealing component 308 can be placed between the outer flange 304a of the coupling chamber 302 and the upper outer flange 304b of the cylinder 314. Bolts 310 can be placed in holes in the two flanges 304a 304b and secured with nuts 312 in order to attach the cylinder 314 to the coupling chamber 302. In place of bolts 310 and nuts 312, the two flanges 304a 304b can be attached using a clamp, for example, a cameron hub clamp. Alternatively, the coupling chamber 302 and cylinder 314 can be welded together or otherwise be a single component. The area of the top of the piston 316 and the pressure applied to it determine the force converted into a conducted acoustic wave in the target media. The area of the plate 318 that is contact with the target media determines the distribution of the force being applied to the target media. Also shown in FIG. 3 is a vent pipe 320 which could have a nozzle, a muffler, and/or a restrictor.

Figure 4:
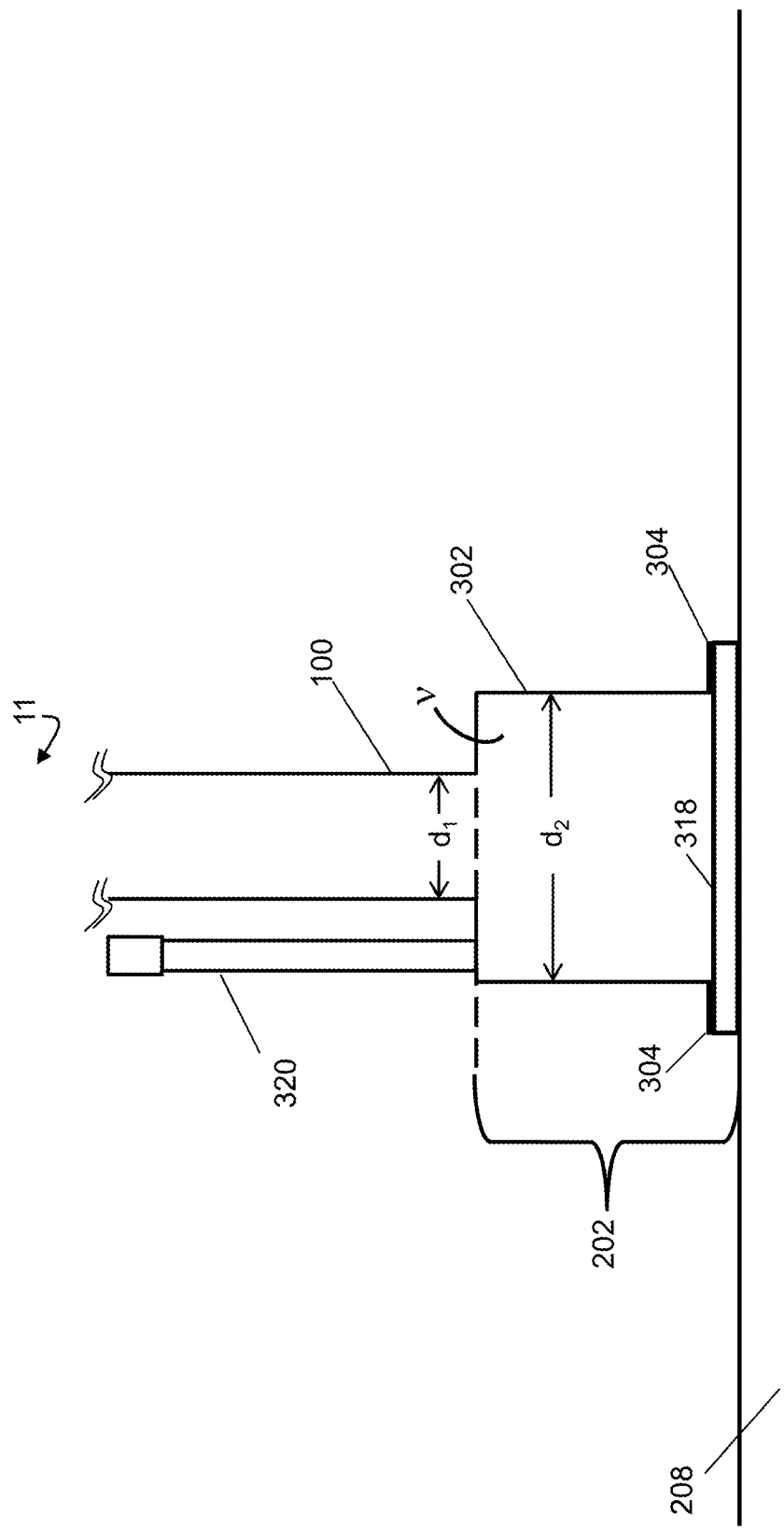
FIG. 4 depicts an exemplary coupling component that includes a coupling chamber and a push plate.

FIG. 4 depicts an exemplary system 400 comprising a overpressure wave generator 11 attached to a coupling component 202 that includes a coupling chamber 302 and a push plate assembly comprising an earth plate 318. The coupling chamber 302 has an outer flange 304 that rests on the plate 318. Such an arrangement requires operation on very hard surfaces like desert earth, roadways, dams, etc.

FIG. 5A depicts an exemplary system 500 comprising an overpressure wave generator 11 attached to a coupling component 202 that includes a coupling chamber 302, a flexible membrane 506, and a push plate assembly comprising a top plate 504, a piston rod 510, and an earth plate 318 that is contact with the target media. The movement of the top plate 504 and piston rod 510 are constrained by a movement constraining vessel 508. The coupling chamber 302 includes an inner flange 502a that prevents the top plate 504 from moving upward. A rubber or comparable sealing component 308 is placed between the inner flange 502a (and optionally outer flange 304a) and the flexible membrane 506. The movement constraining vessel has an upper outer flange 304b and an lower inner flange 502b where the top plate 504 can move between the flexible membrane 506 and the lower inner flange 502b. The top plate 504 and earth plate 318 may be rigid disks having low mass and strength such as titanium, aluminum, or composite materials such as carbon composite or fiber glass. Alternatively, they may be made of steel. The piston rod 510 and movement constraining vessel may each be pipes that are also rigid and low mass and may be titanium, aluminum, or composite materials such as carbon composite or fiber glass. Alternatively, they may be made of steel.

Figure 5B:
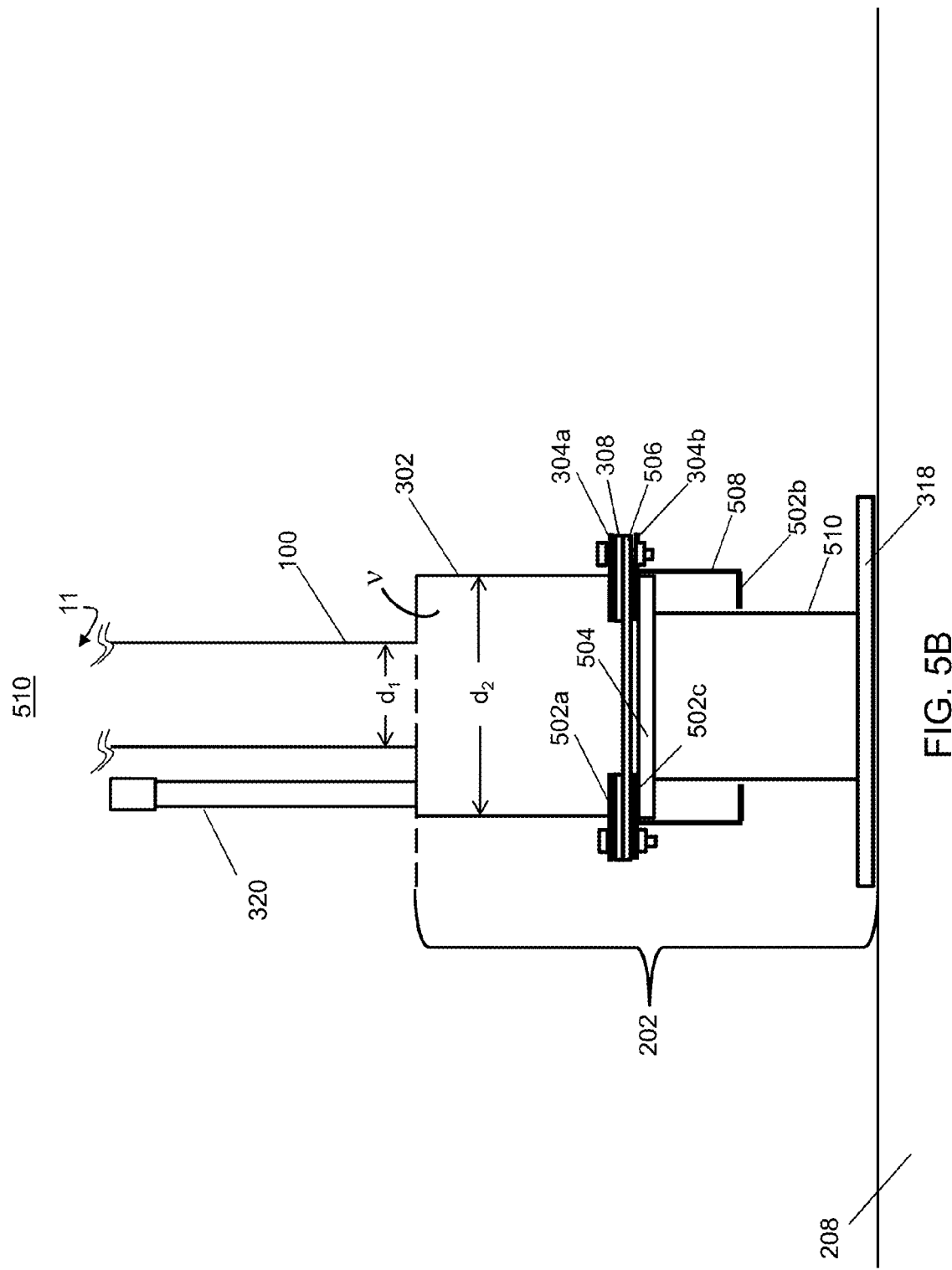

FIG. 5B depicts an exemplary system 510 similar to the system 500 of FIG. 5A except the movement constraining vessel 508 includes an upper inner flange 502c. As such, the top plate 504 can move between the lower inner flange 502b and the upper inner flange 502c. FIG. 5C depicts an exemplary system 520 similar to the system 510 except the inner flange 502a of the coupling chamber is not present. FIG. 5D depicts and alternative shape for a top plate 504, which can be used when the movement constraining vessel 508 includes as upper inner flange 502c such as with exemplary systems 510 and 520 of FIGS. 5B and 5C.

One skilled in the art will recognize that the top plate 504, piston rod 510, and earth plate 318 could be all one piece. Moreover, a piston rod, which was so named since its basic function is similar to a piston rod of a car engine, could be shaped differently where it doesn't resemble a rod, per se. As such, the term piston rod is not intended to be limiting in any way but instead only to indicate that it enables a force to be translated in a direction. Additionally, the function of constraining movement of a push plate could be achieved using all sorts of different approaches. For example, pins extending from the piston rod could slide up in down inside slots in the sides of the movement constraining vessel which then might not require inner flanges 502b 502c. Various other approaches are also possible for enabling quick attachment and detachment of the coupling chamber from the movement constraining vessel or otherwise enabling replacement of a membrane 506. For example a sealable membrane cartridge might slide into a slot in the side of a coupling chamber that could then be bolted onto from the side thereby eliminating the requirement to detach the coupling chamber from the movement constraining vessel. Such a cartridge might slide in between inner flanges 502a and 502c such as depicted in FIG. 5B. A hinge-like mechanism might also be employed enabling the coupling chamber to be tilted relative to the movement constraining vessel during replacement of a membrane.

Figure 6:
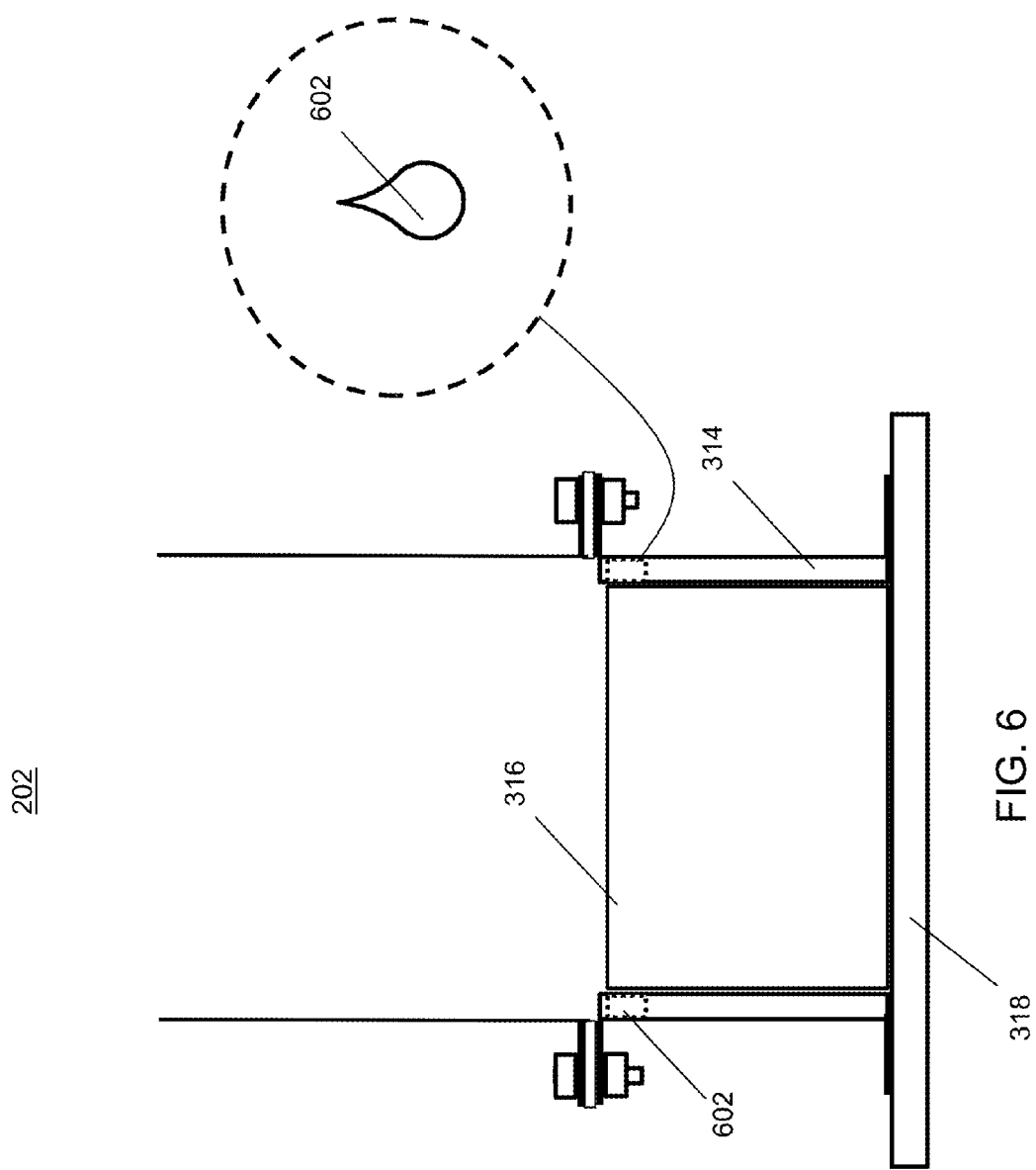
FIG. 6 depicts an exemplary coupling component of FIG. 3 with exhaust vent holes shaped to control an exhaust rate.

FIG. 6 depicts an exemplary coupling component 202 of FIG. 3 with exhaust vent holes 602 shaped to control an exhaust rate. Under one arrangement the holes may be shaped similar to a tear drop.

Figure 7:
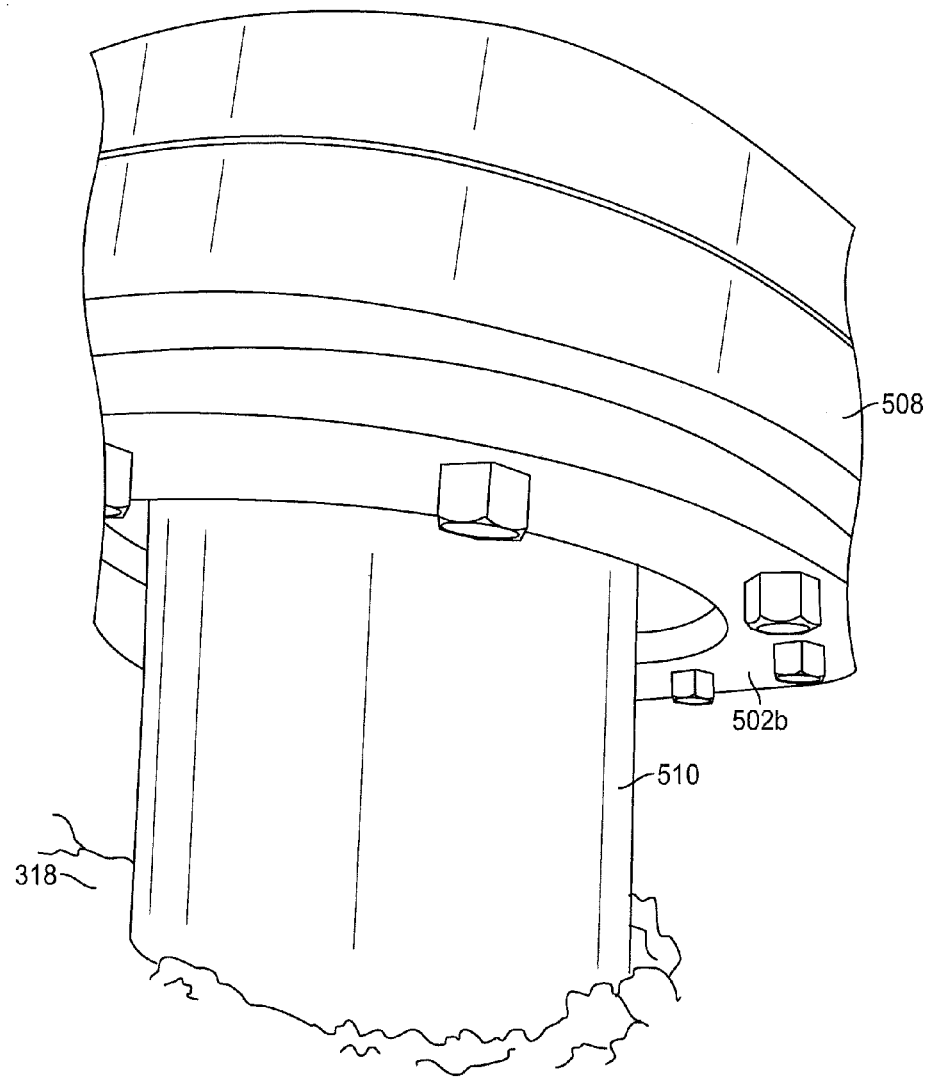
FIG. 7 depicts the piston rod and second plate of an operational overpressure wave generator.

FIG. 7 depicts the piston rod and earth plate of an operational overpressure wave generator.

Figure 8:
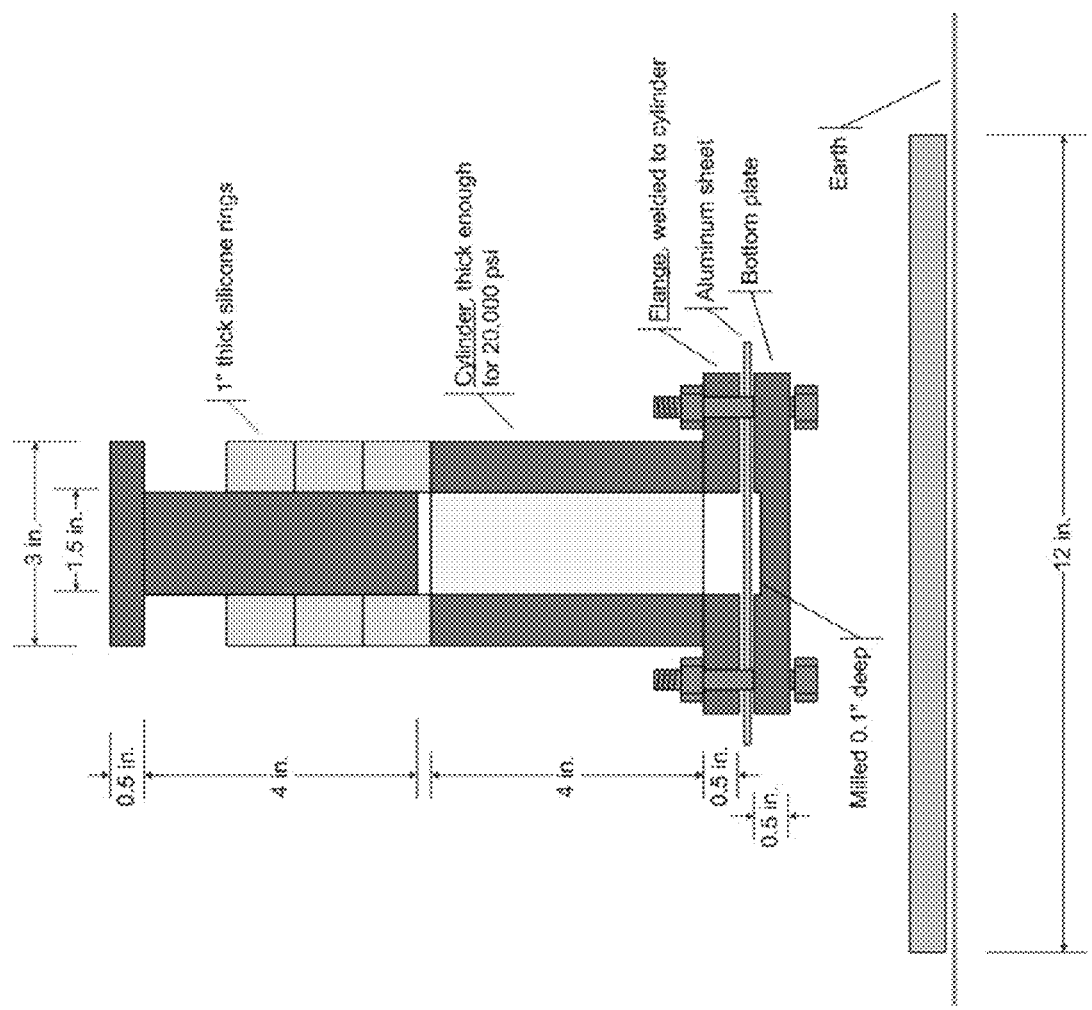
FIG. 8 depicts an exemplary overpressure wave generator configured to form metal.

FIG. 8 depicts an exemplary overpressure wave generator configured to form metal.

One skilled in the art will recognize that although this disclosure involves a single coupling component being attached to a single detonation tube from a single overpressure wave generator, all sorts of combinations of multiple detonation tubes and/or multiple overpressure wave form generators and a single coupling component are possible as well as combinations of multiple coupling components, which might interact with a common earth plate.

Under one arrangement, one or more overpressure wave generators directing overpressure waves towards a target media are combined with one or more overpressure wave generators directing overpressure waves away from the target media such that their combined generated forces are balanced to prevent recoil of the system.

Using a Vehicle to Constrain Movement of an Overpressure Wave Generator

Figure 9:
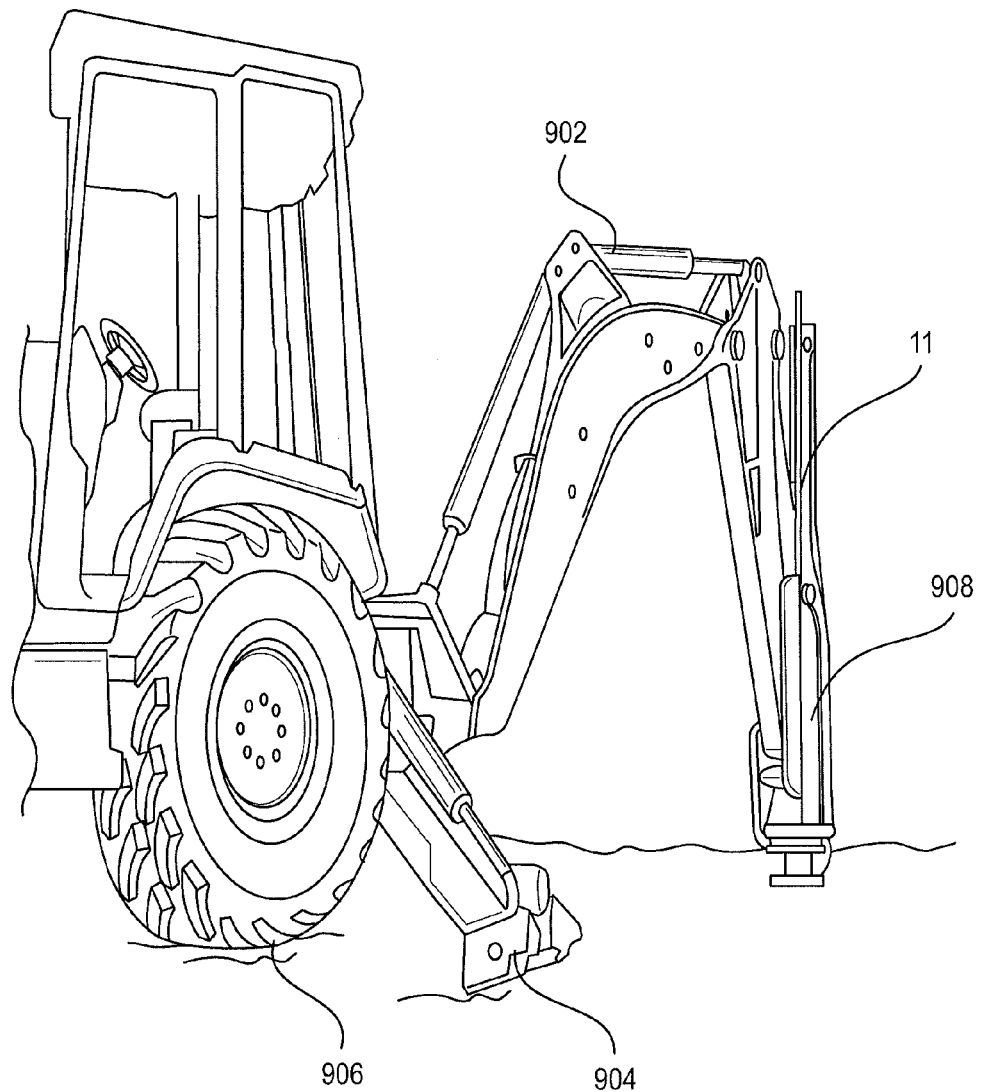
FIG. 9 depicts an exemplary backhoe tractor with the shovel removed that is used to provide a mass to an overpressure wave generator.

FIG. 9 depicts an exemplary backhoe tractor 902 with the shovel removed that is used to provide a mass to an overpressure wave generator 11 during detonation of the overpressure wave generator 11. As shown, stabilizers 904 and the wheels 906 of the tractor 902 have been lifted off the ground using the front loader and the backhoe 902 is attached to the generator 11 using a backhoe attachment apparatus 908. Not shown is the front loader which is also in contact with the ground such that substantially the weight of the vehicle is being applied to the overpressure wave generator 11 that is in contact with the ground.

Figure 10:
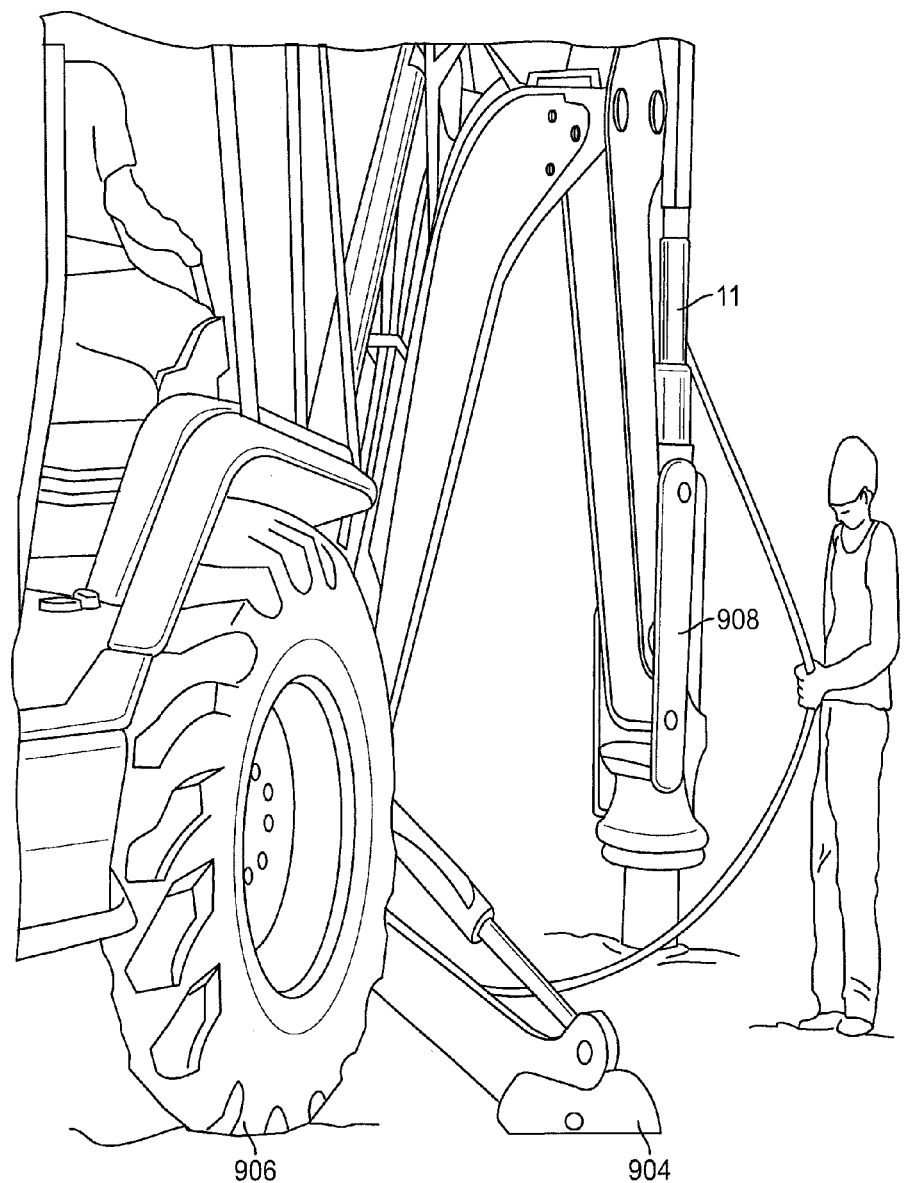
FIGS. 10-13 depict exemplary use of the backhoe arm to maneuver the overpressure wave generator relative to the target media.
Figure 11:
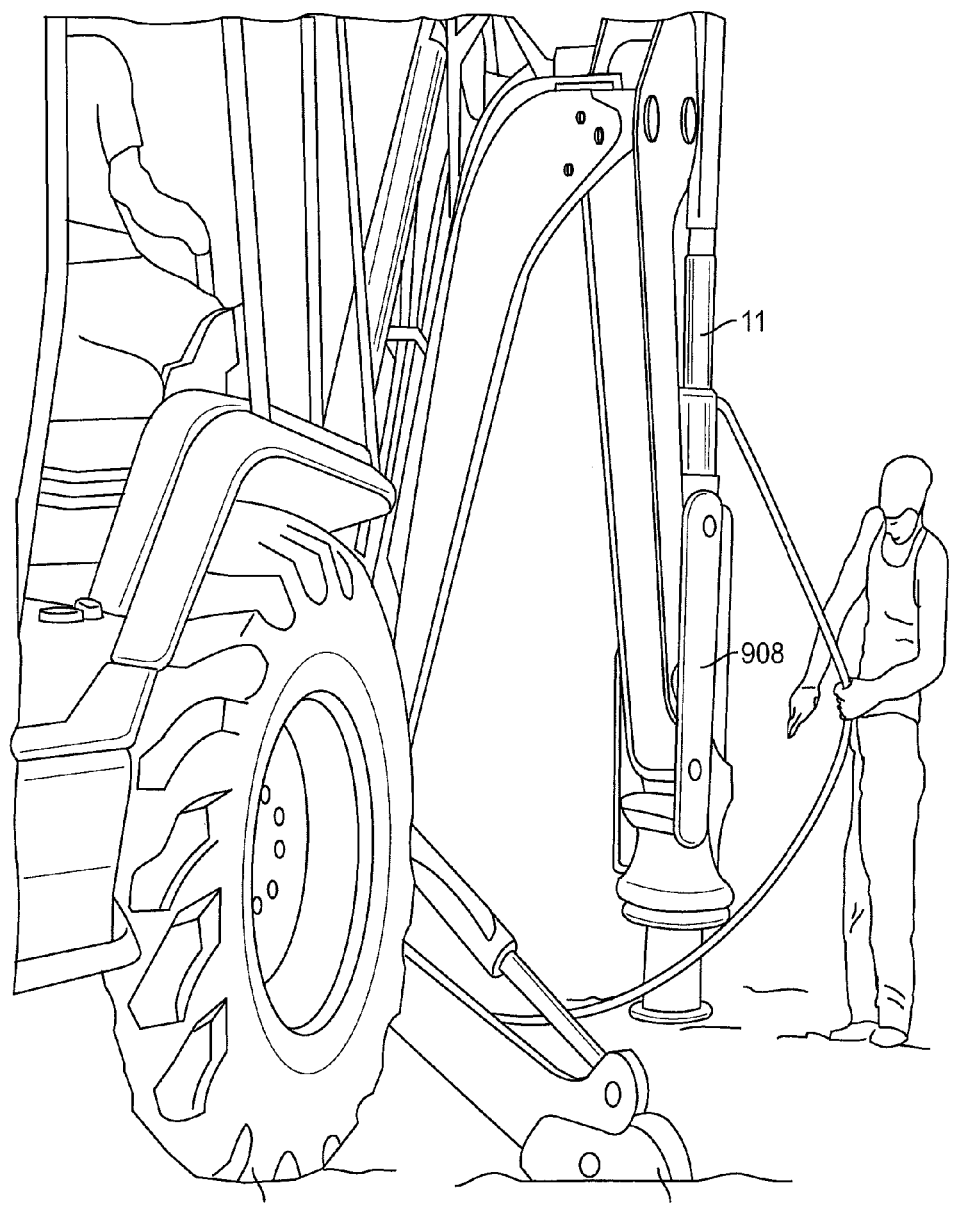
Figure 12:
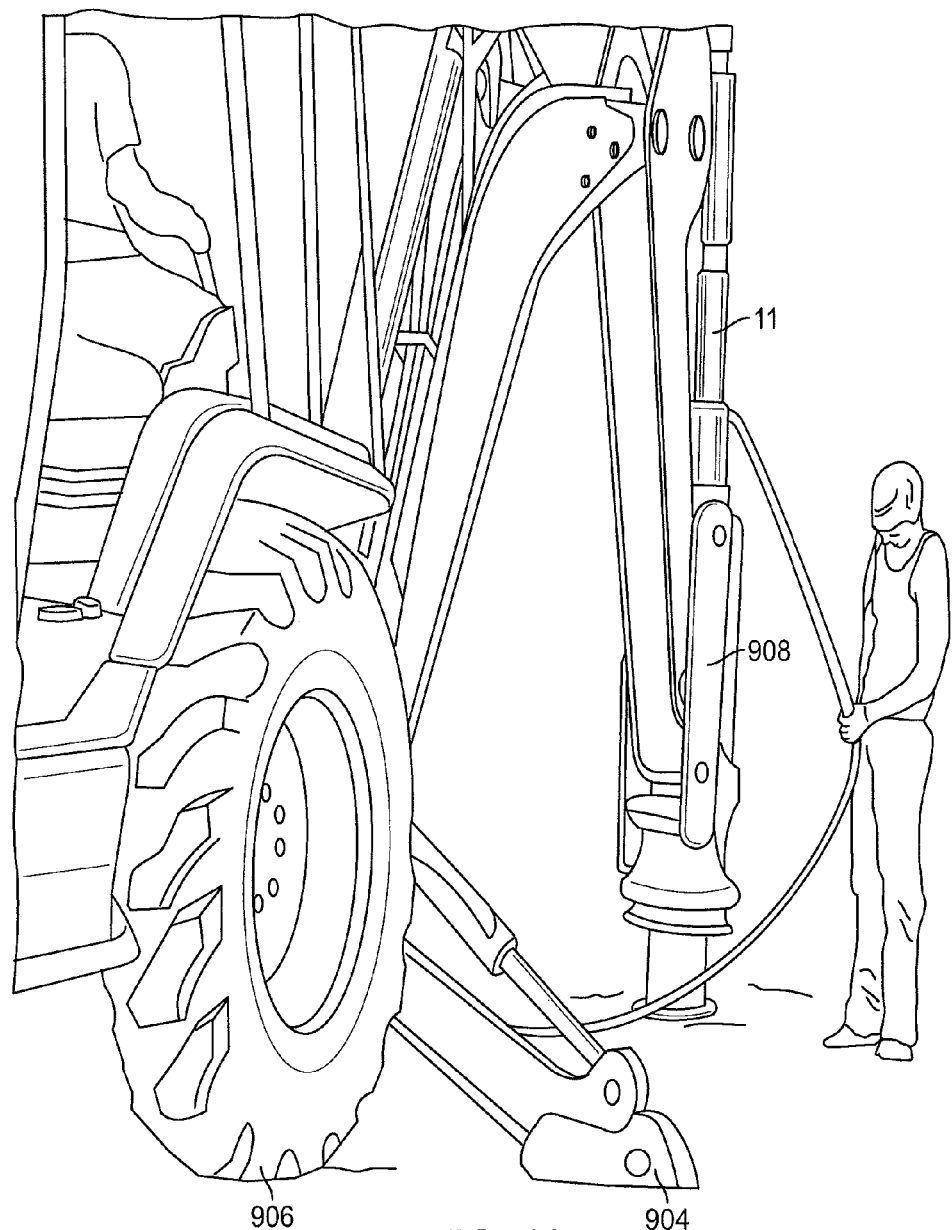
Figure 13:
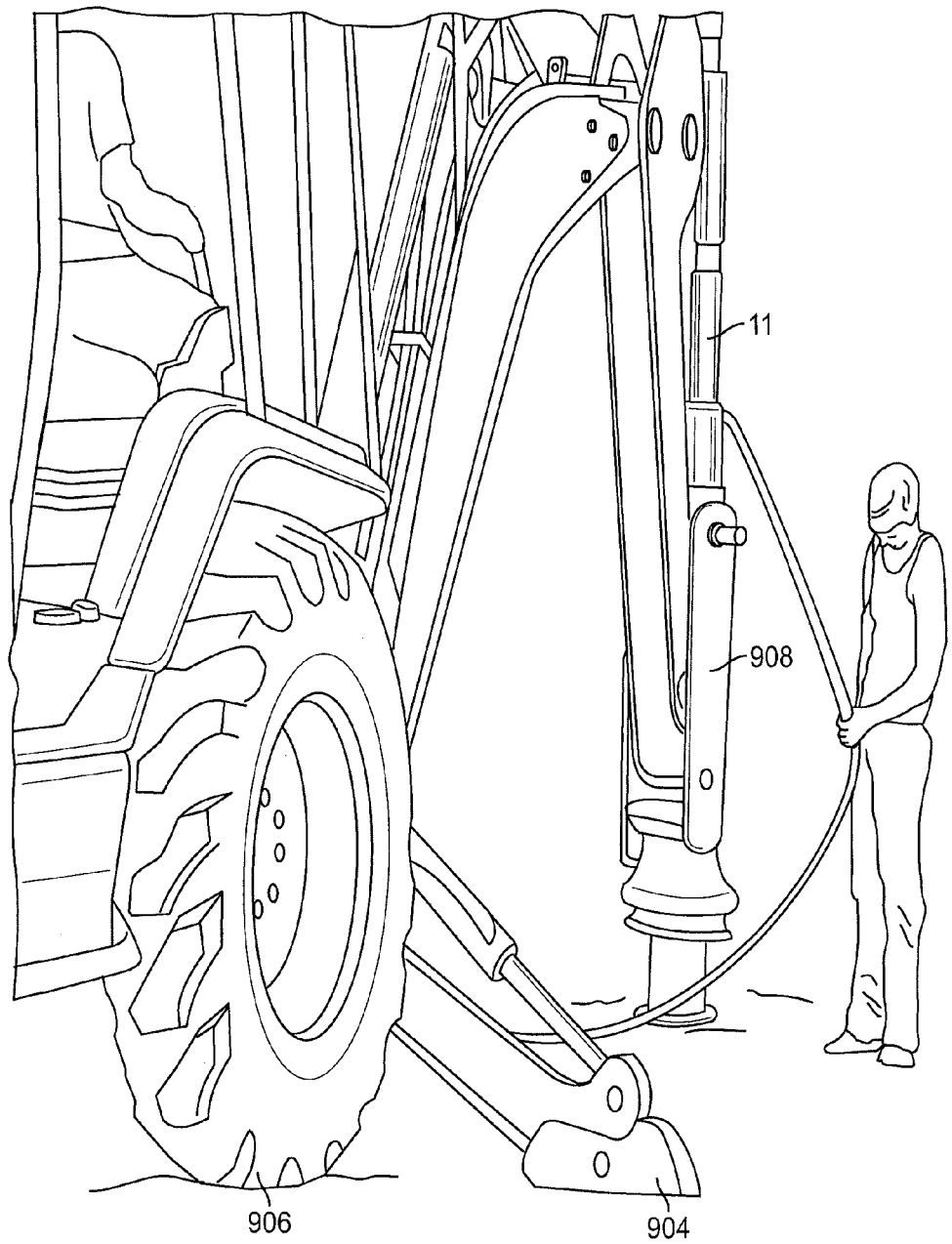

FIGS. 10-13 depict exemplary use of a backhoe arm to maneuver the overpressure wave generator relative to the target media. Referring to FIG. 10, the overpressure wave generator is shown being maneuvered by the arm of the backhoe. As shown, the overpressure wave generator is approximately four to six inches from the ground as it is being lowered into place. FIG. 11 shows the overpressure wave generator as it is coming into contact with the ground. FIG. 12 shows the overpressure wave generator in contact with the ground, where the backhoe arm is being used to pivot the coupling chamber of the overpressure wave generator so as to align or aim it. FIG. 13 shows the overpressure wave generator after it has been maneuvered into place and aligned with the ground.

Figure 14:
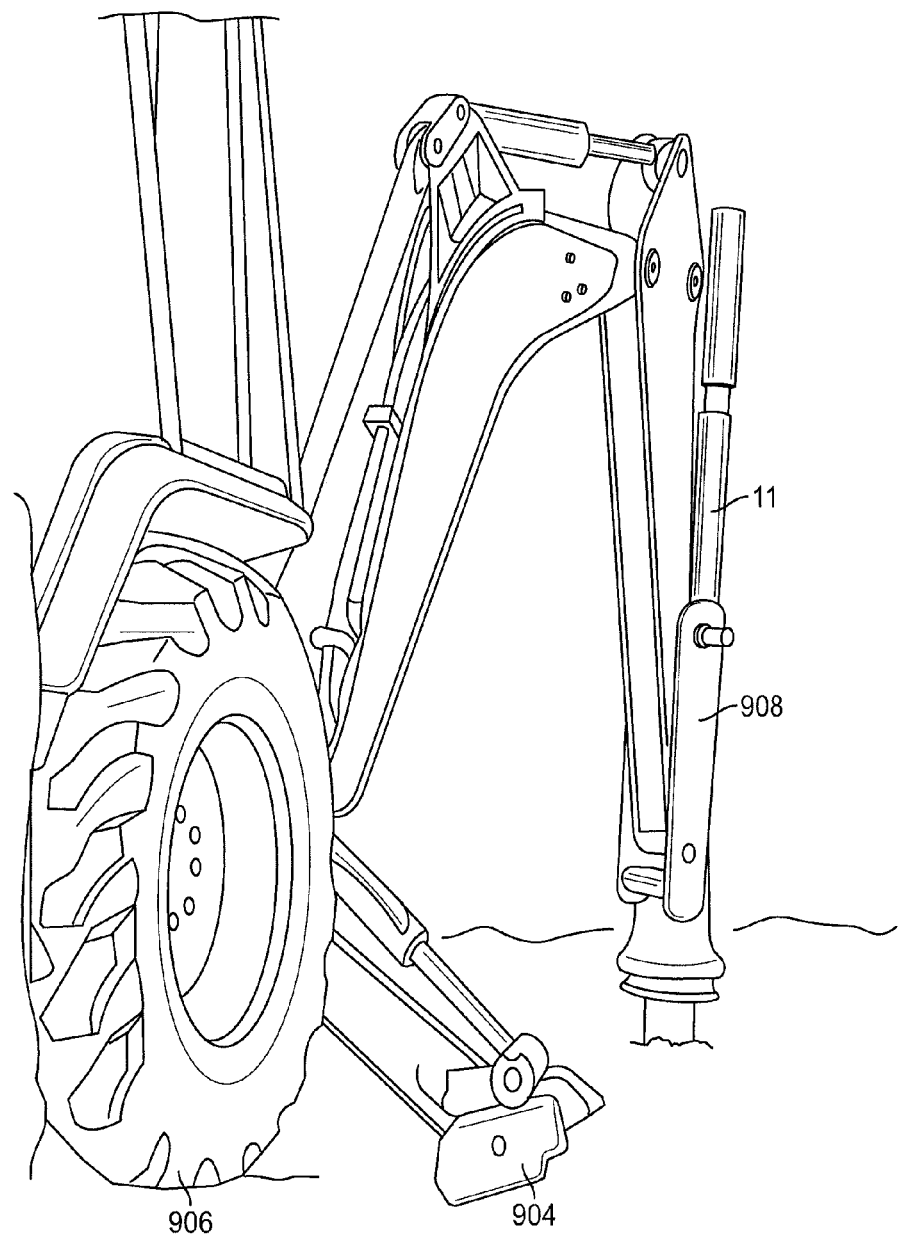
FIGS. 14-16 depict the backhoe and overpressure wave generator before, during, and immediately after generation of an overpressure wave.
Figure 15:
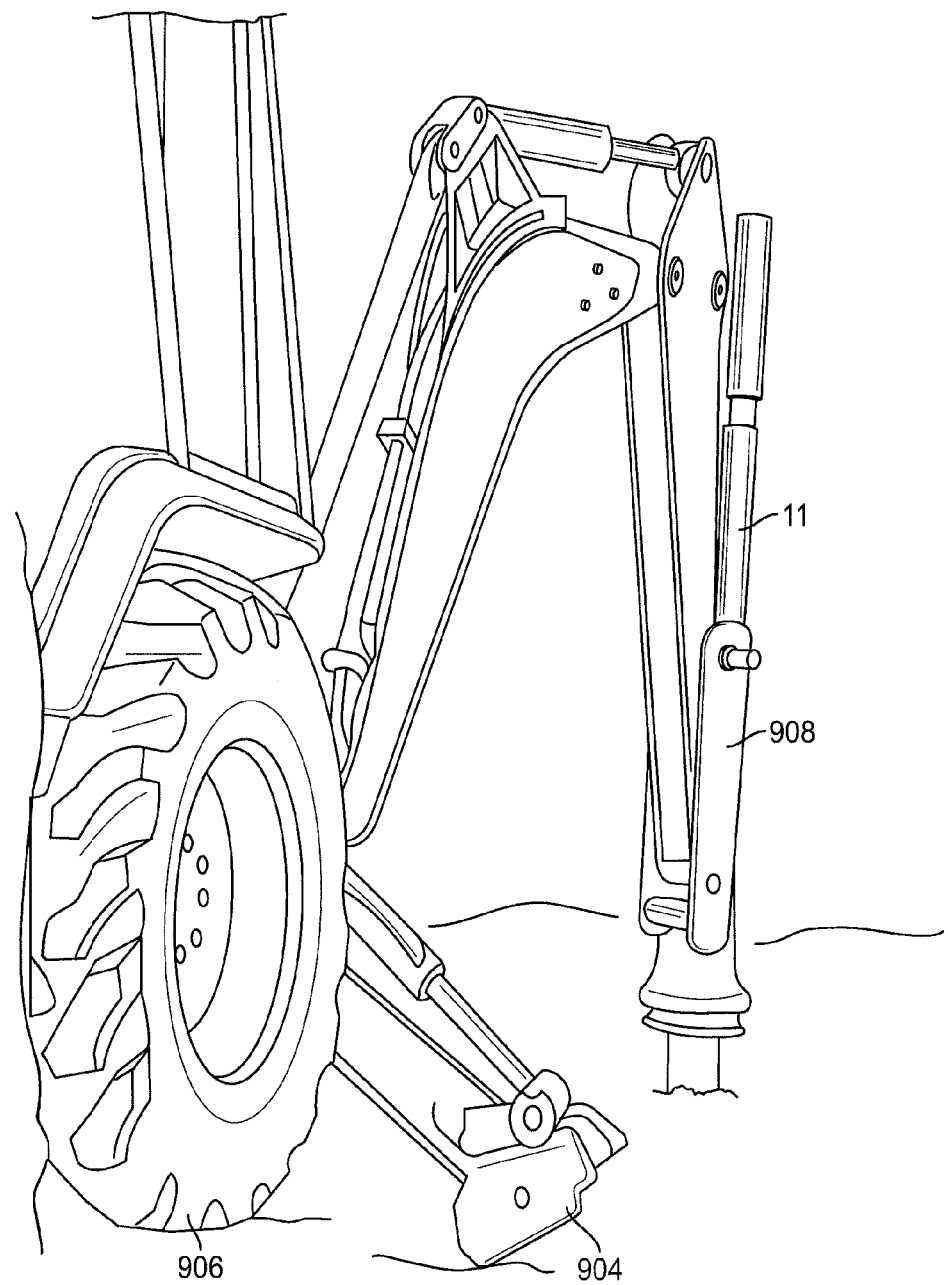
Figure 16:
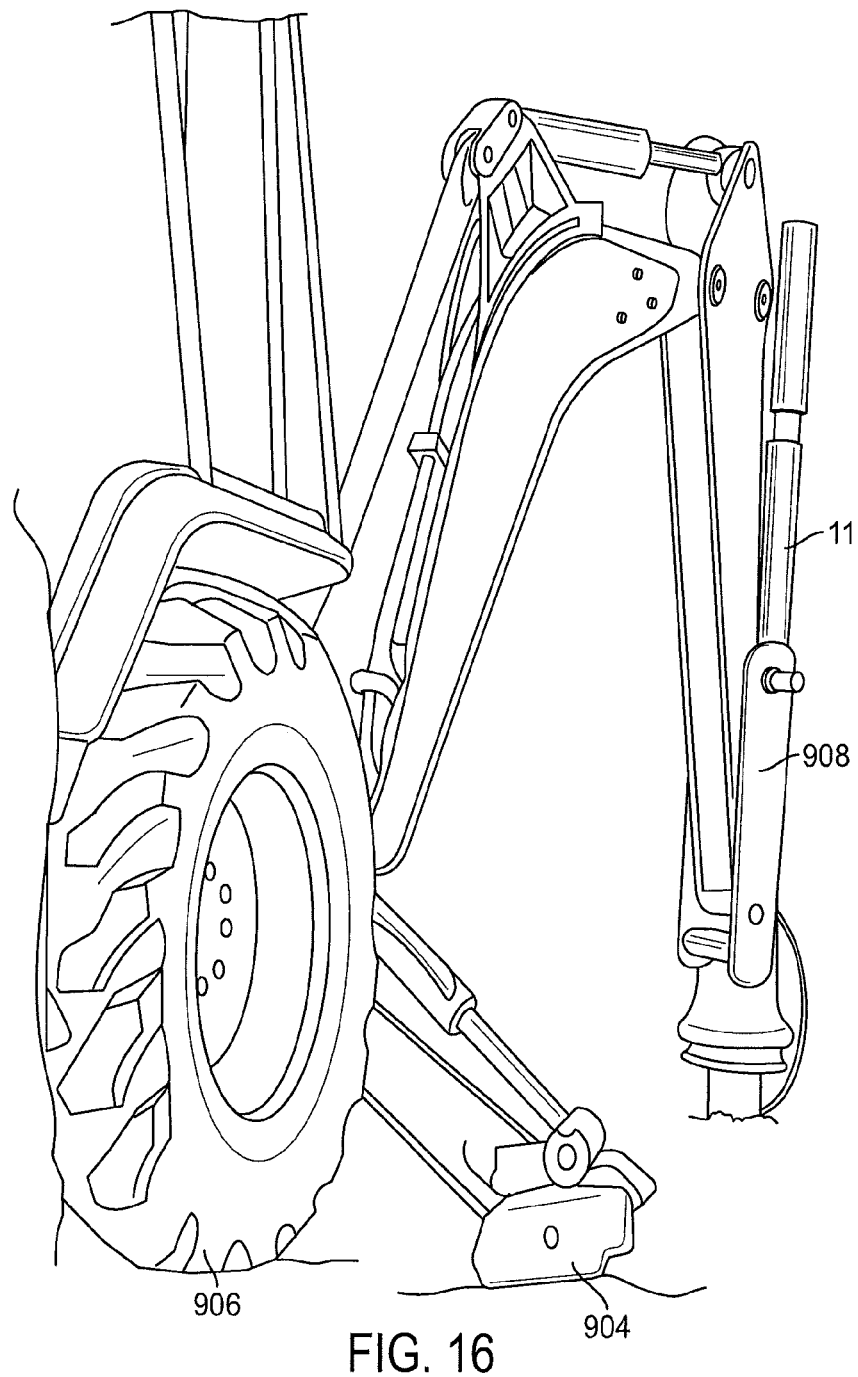

FIGS. 14-16 depict the backhoe and overpressure wave generator before, during, and immediately after generation of an overpressure wave. As shown in FIG. 14, prior to detonating the overpressure wave generator, the stabilizers can be lifted and/or the front loader rotated so that the stabilizers are off the ground such that a substantial portion of the weight of the vehicle is applied to the overpressure wave generator. FIG. 15 depicts the upward movement of the overpressure wave generator due to the recoil force produced by the generation of an overpressure wave. As seen, the piston of the overpressure wave generator stays in contact with the ground but the coupling chamber, the remainder of the overpressure wave generator and the back of the backhoe are lifted approximately three inches when the overpressure wave generator is detonated. FIG. 16 depicts the overpressure wave generator immediately after detonation where the backhoe is still slightly lifted by the recoil force.

FIGS. 17 and 18 depict two different views of an exemplary overpressure wave generator attached to the arm of a backhoe via a backhoe attachment apparatus.

Figure 19:
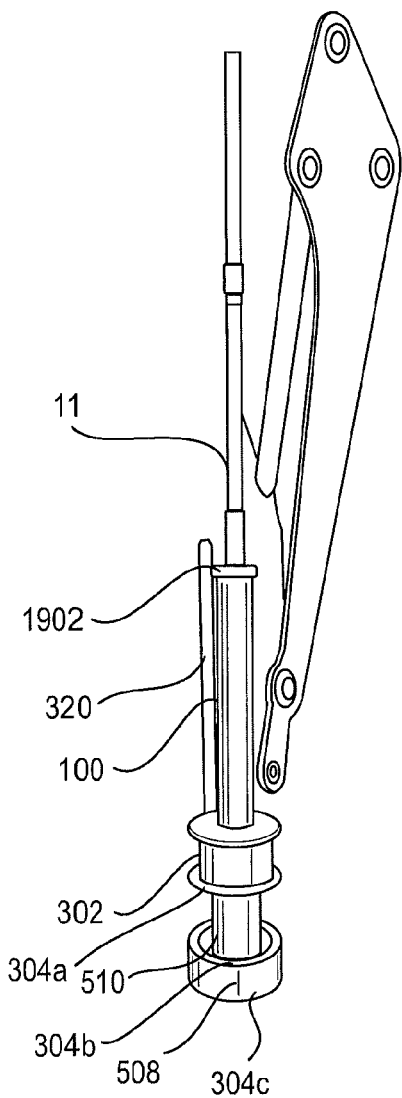
FIG. 19 depicts the overpressure wave generator prior to the addition of a backhoe attachment apparatus for attaching the overpressure wave generator to the arm of a backhoe.

FIG. 19 depicts the overpressure wave generator prior to the addition of a backhoe attachment apparatus for attaching the overpressure wave generator to the arm of a backhoe. Referring to FIG. 19, an overpressure wave generator 11 in accordance with the embodiment of the invention shown in FIG. 5 is shown sitting on the ground near the arm of a backhoe. The generator 11 includes a detonation tube 100 attached to a coupling chamber 302. A vent pipe 320 is attached to the coupling chamber 302. A piston rod 510 is shown beneath the coupling chamber 302 having an outer flange 304a. The movement constraining vessel 508 having outer flange 304b and optional second outer flange 304c is shown detached from the coupling chamber 302. An upper support plate 1902 of thick heavy grade steel is shown having been welded on top of the largest detonation tube 100 and around vent pipe 320.

Figure 20:
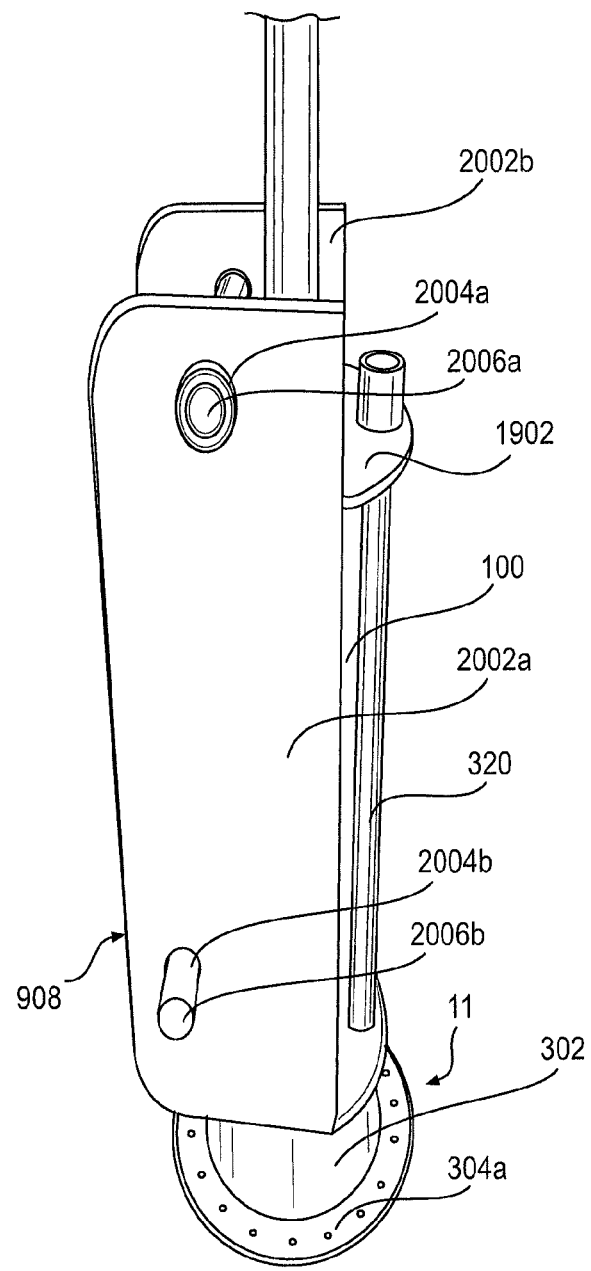
FIG. 20 depicts a left side view of the backhoe attachment apparatus having been welded to an overpressure wave generator.

FIG. 20 depicts a left side view of the backhoe attachment apparatus 908 having been welded to an overpressure wave generator 11. The backhoe attachment apparatus 2002 includes a left side support 2002a and a right side support 2002b that are both welded to the upper support plate 1902 and to the top of the coupling chamber 302. The left side support and right side support are thick heavy grade steel having holes that receive upper bosses 2004a and lower bosses 2004b. As previously described, such components could alternatively be made of a material having low mass and strength such as titanium, aluminum, or composite materials such as carbon composite or fiber glass. An upper pin 2006a is shown installed in the upper bosses 2004a. A lower pin 2006b is shown installed in the lower bosses 2004b.

Figures 21, 22:
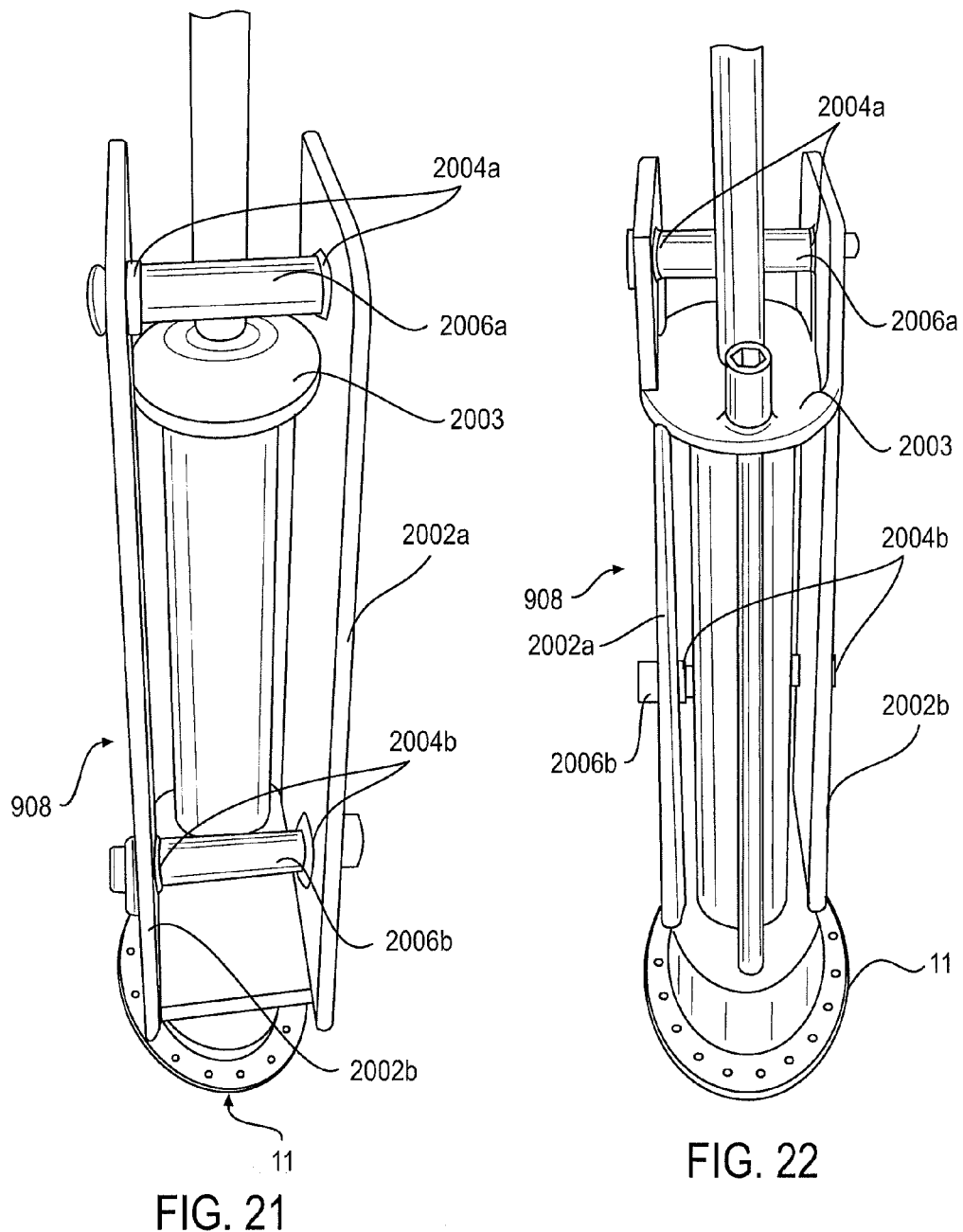
FIG. 21 depicts a front view of the backhoe attachment apparatus having been welded to an overpressure wave generator.
FIG. 22 depicts a back view of the backhoe attachment apparatus having been welded to an overpressure wave generator.

FIG. 21 depicts a front view of the backhoe attachment apparatus 908 having been welded to an overpressure wave generator 11.

FIG. 22 depicts a back view of the backhoe attachment apparatus 908 having been welded to an overpressure wave generator 11.

Figure 23:
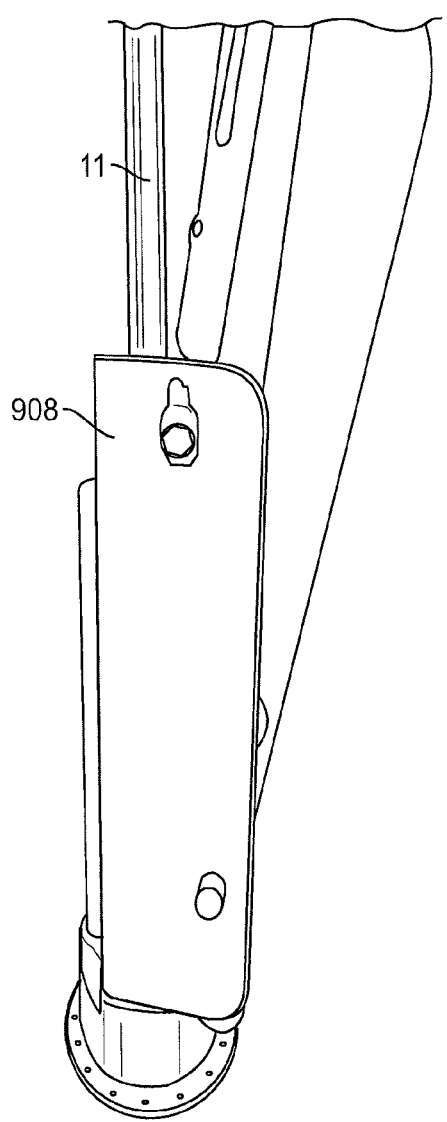
FIG. 23 depicts a side view of a top portion of an overpressure wave generator with a backhoe attachment apparatus having been attached to a backhoe.

FIG. 23 depicts a side view of a top portion of an overpressure wave generator 11 with a backhoe attachment apparatus 908 having been attached to a backhoe 902.

Figure 24:
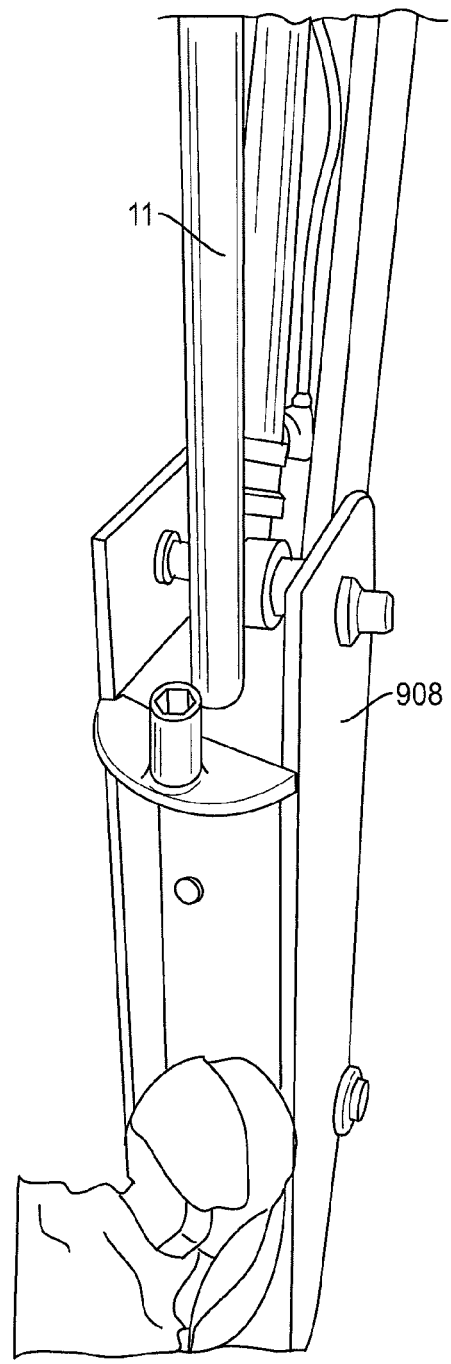
FIG. 24 depicts a rear view of an overpressure wave generator with a backhoe attachment apparatus having been attached to a backhoe.

FIG. 24 depicts a rear view of an overpressure wave generator 11 with a backhoe attachment apparatus 908 having been attached to a backhoe 902.

Figure 25:
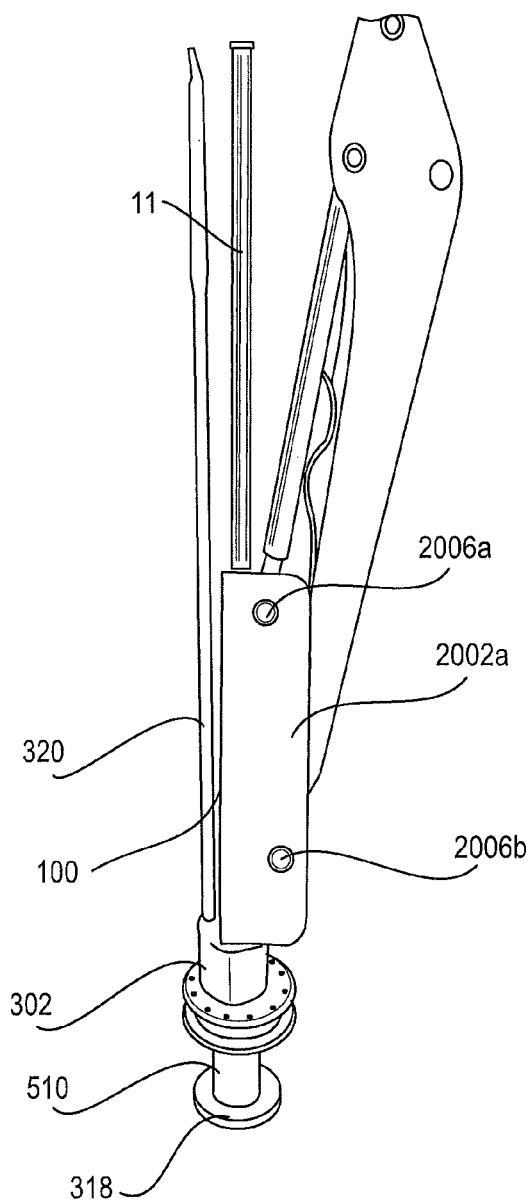
FIG. 25 depicts a side view of an overpressure wave generator with a backhoe attachment apparatus having been attached to a backhoe.
Figure 26:
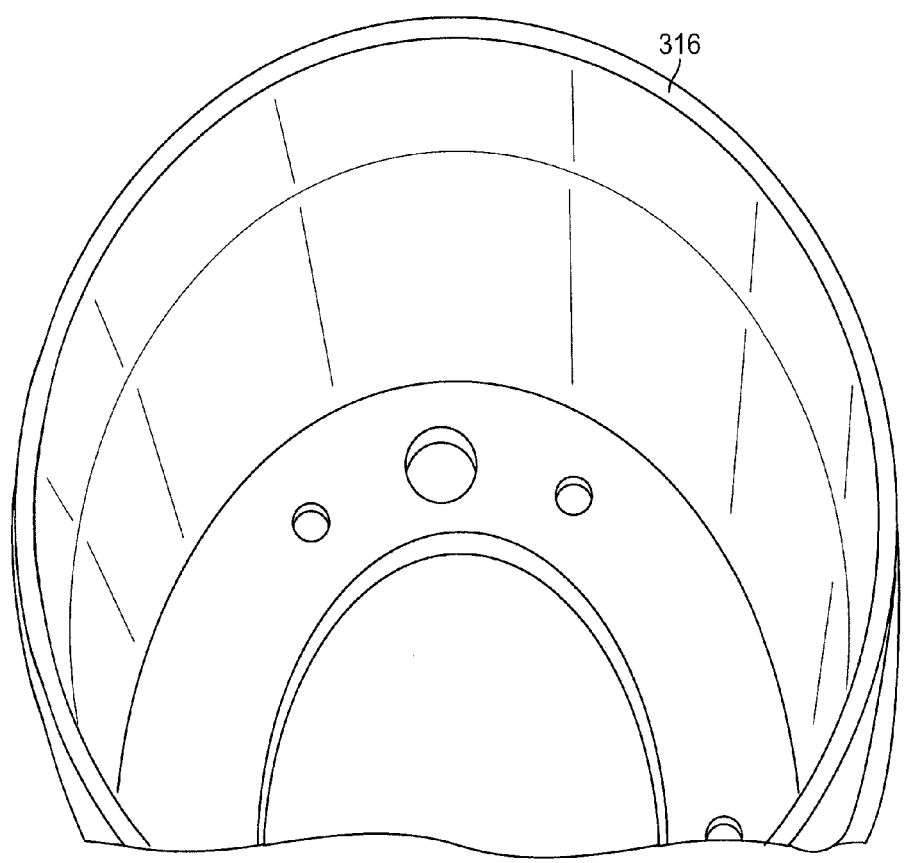
FIGS. 26-36 depict an exemplary piston in accordance with the embodiment of the invention shown in FIG. 3.
Figure 27:
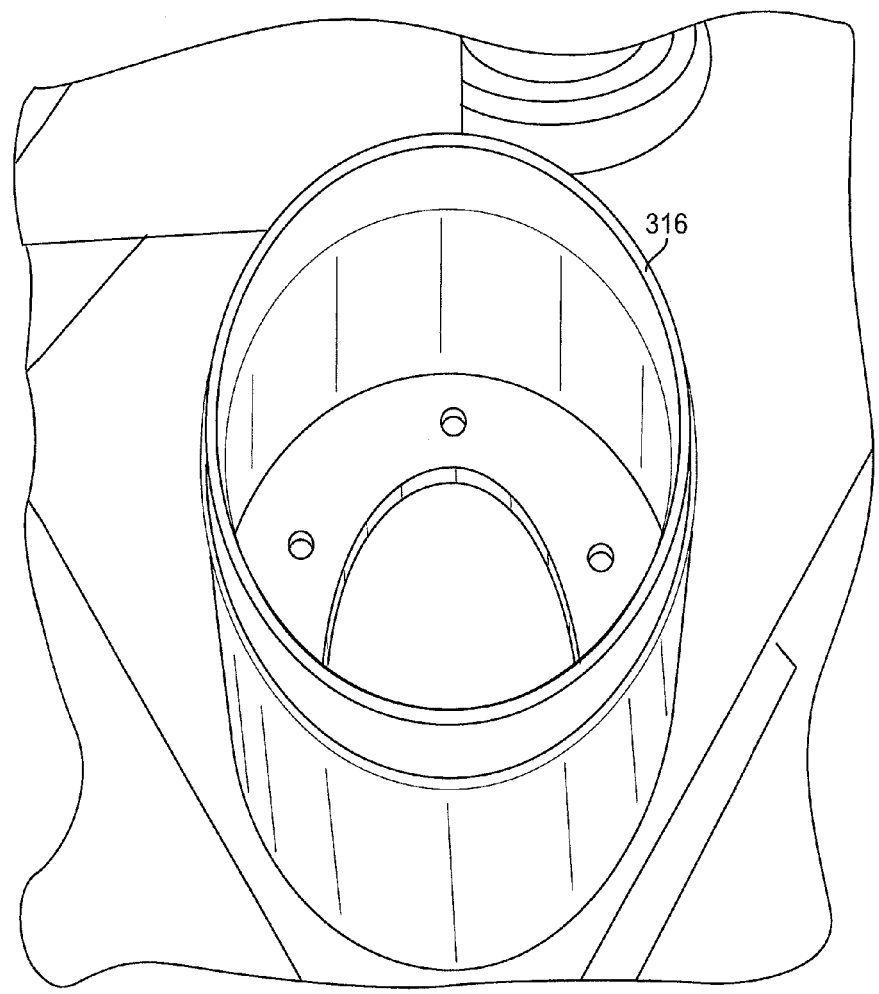
Figure 28:
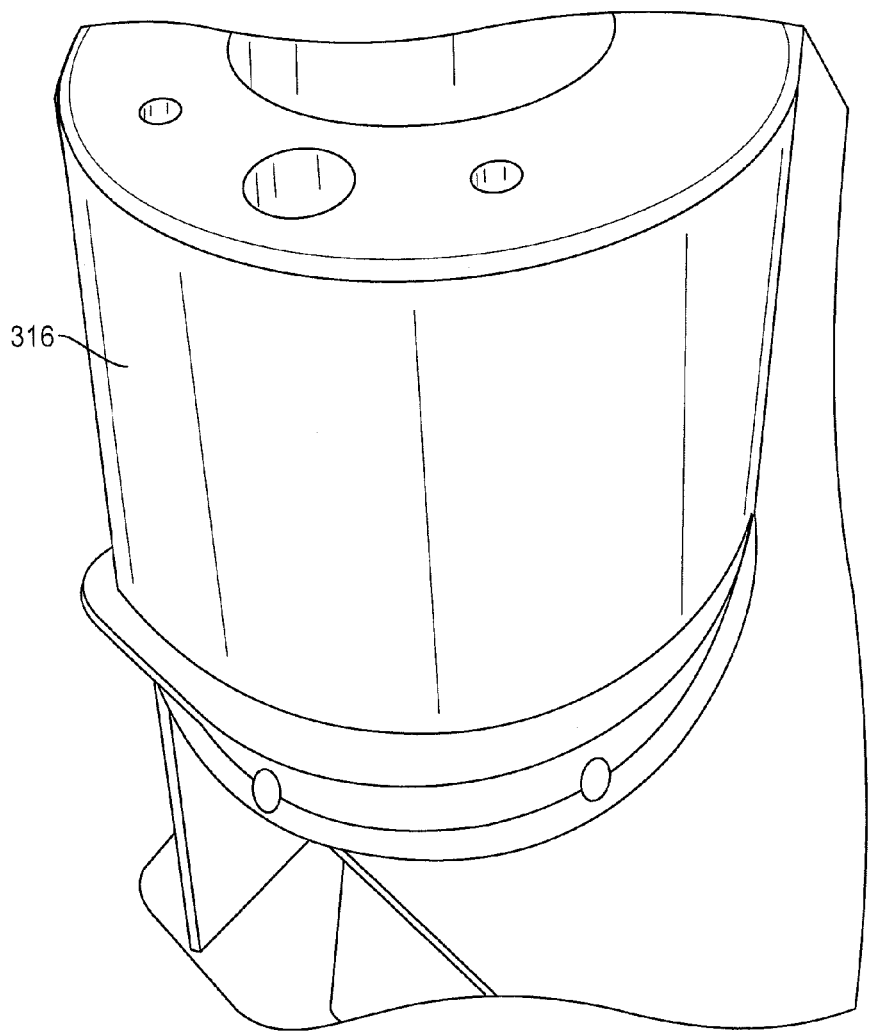
Figure 29:
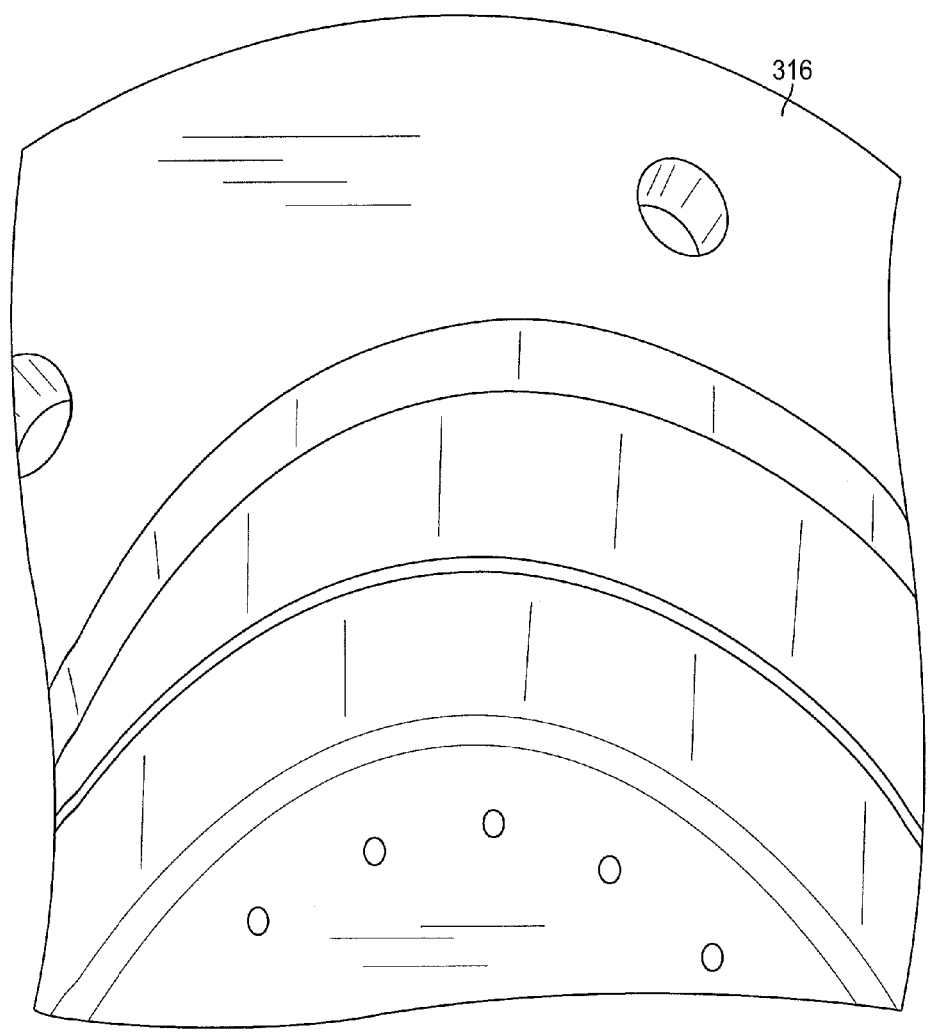
Figure 30:
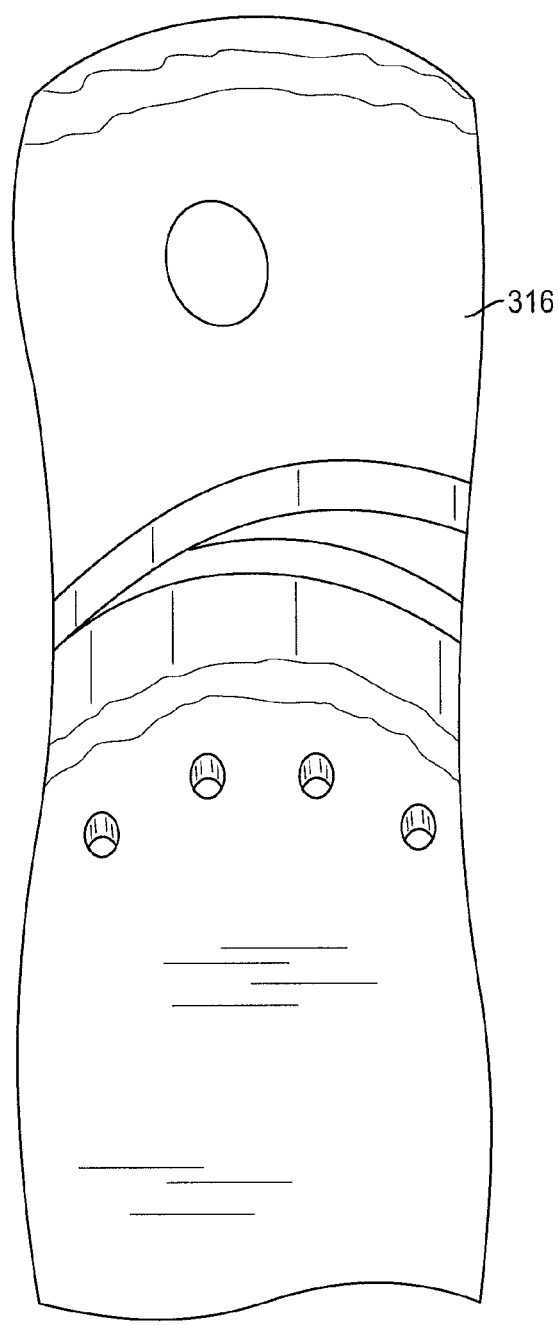
Figure 31:
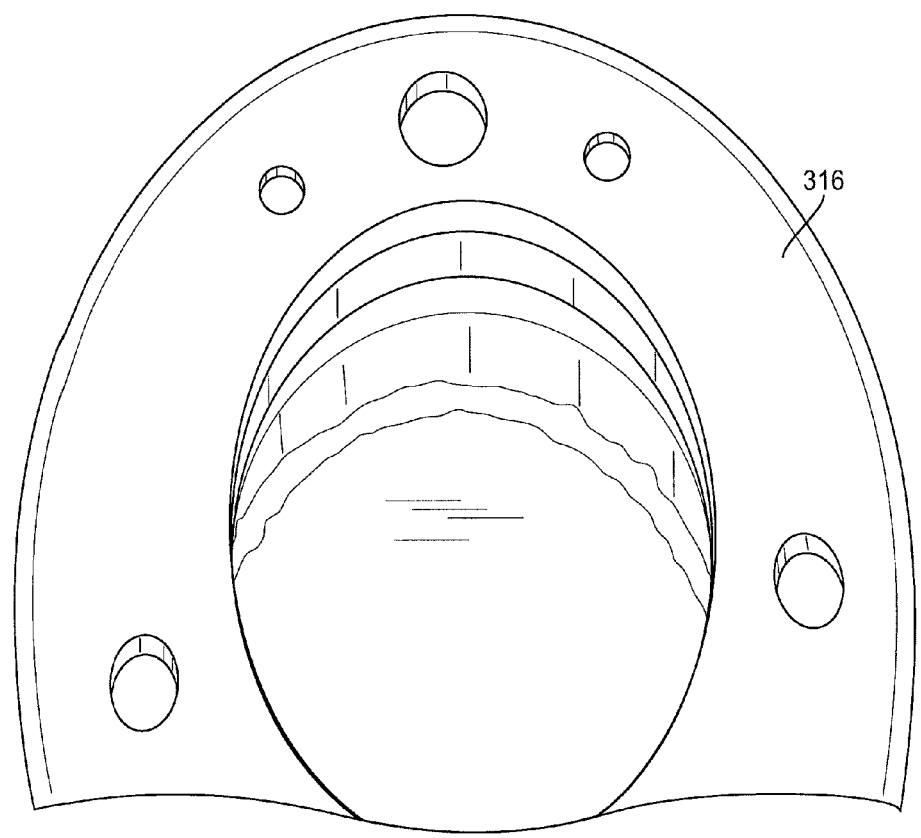
Figure 32:
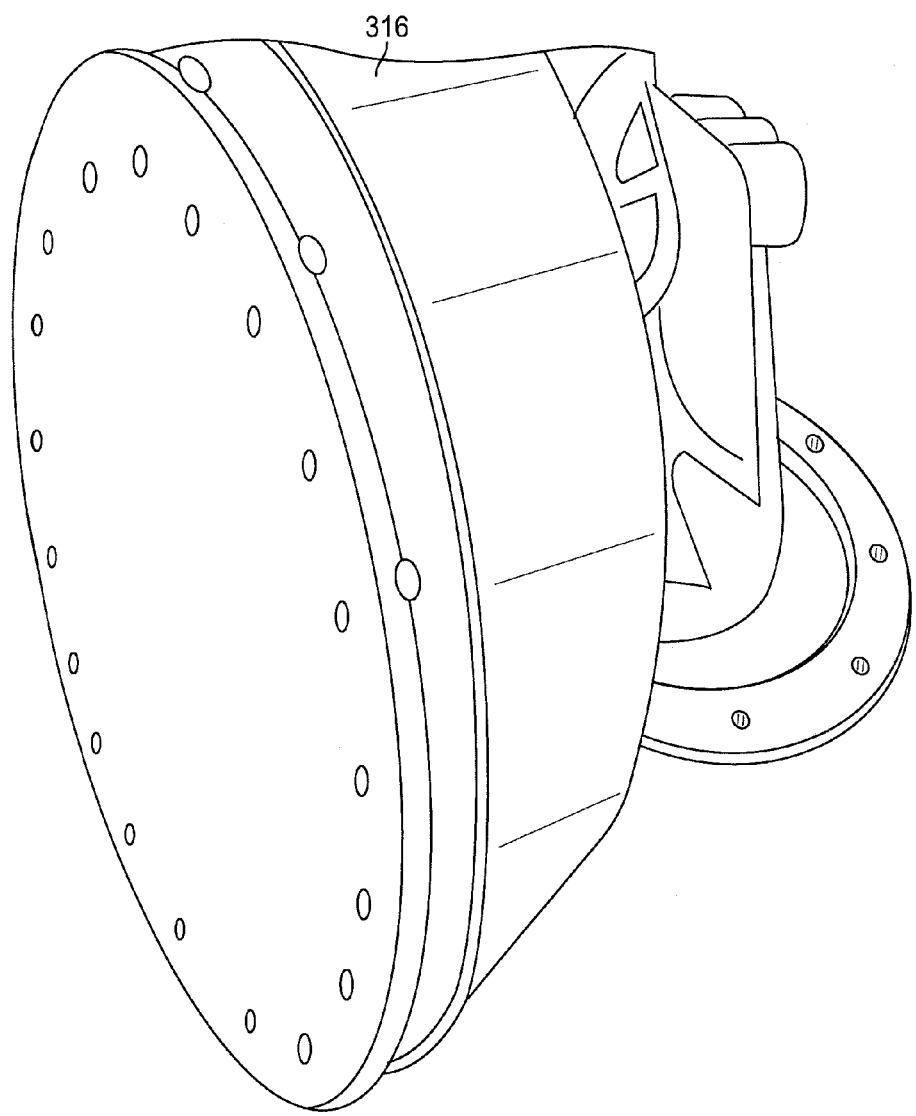
Figure 33:
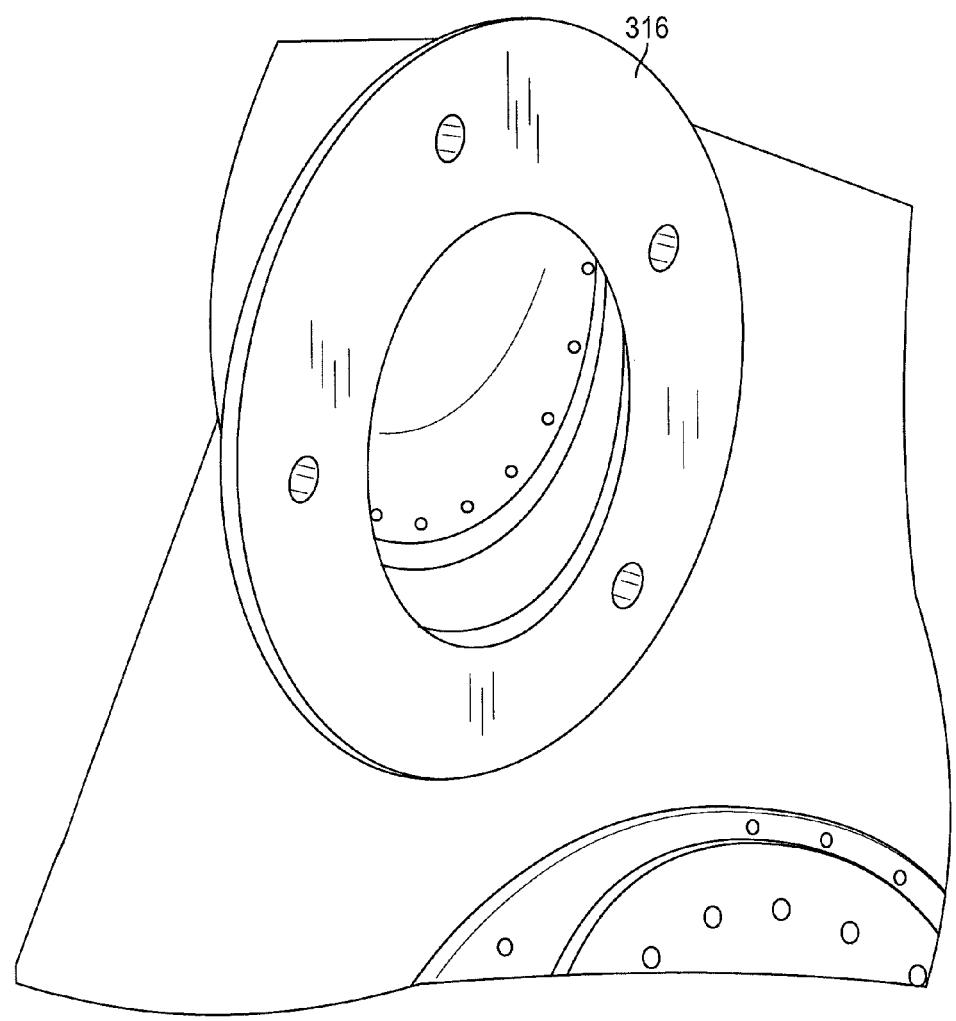
Figure 34:
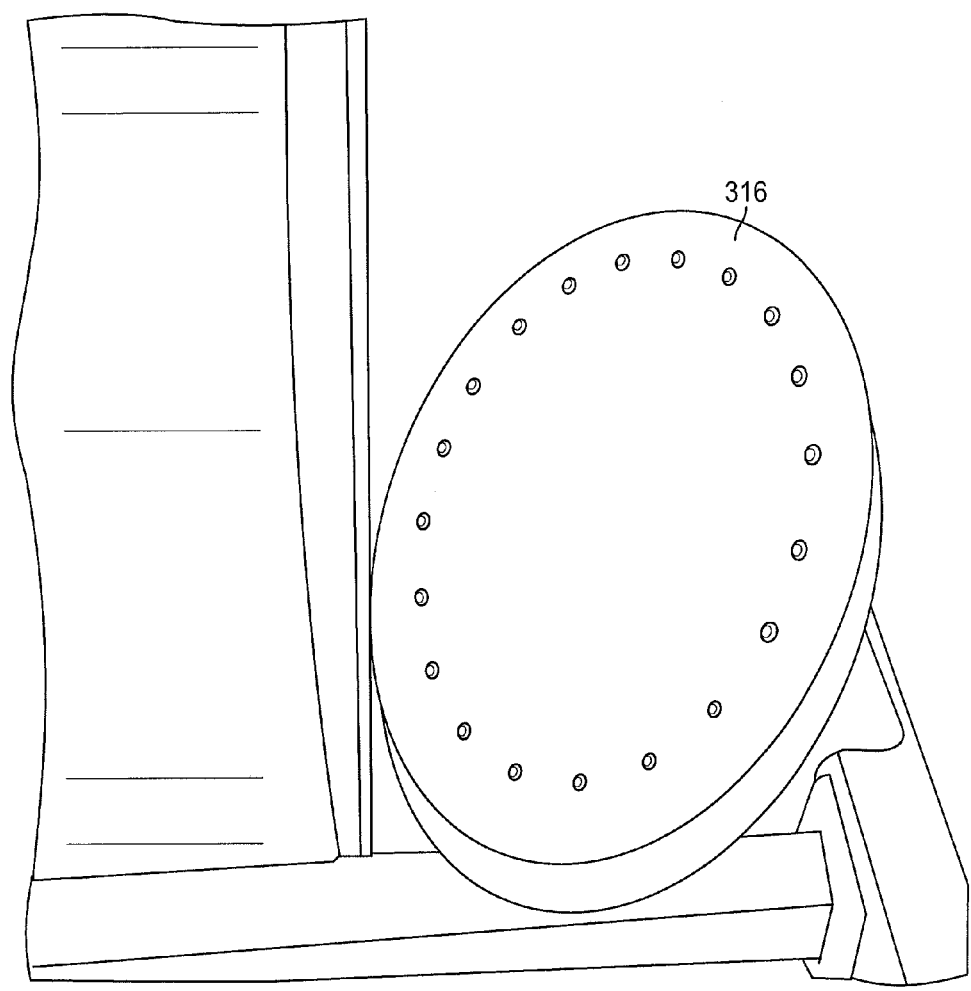
Figure 35:
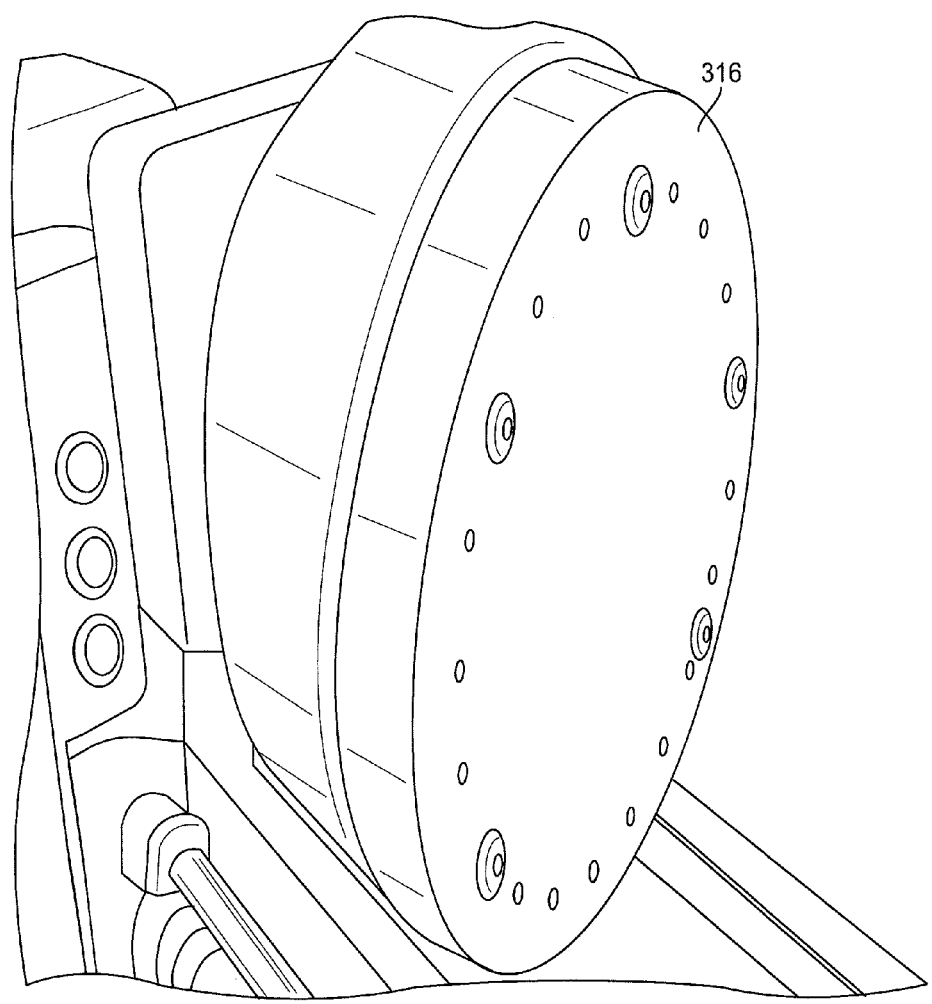
Figure 36:
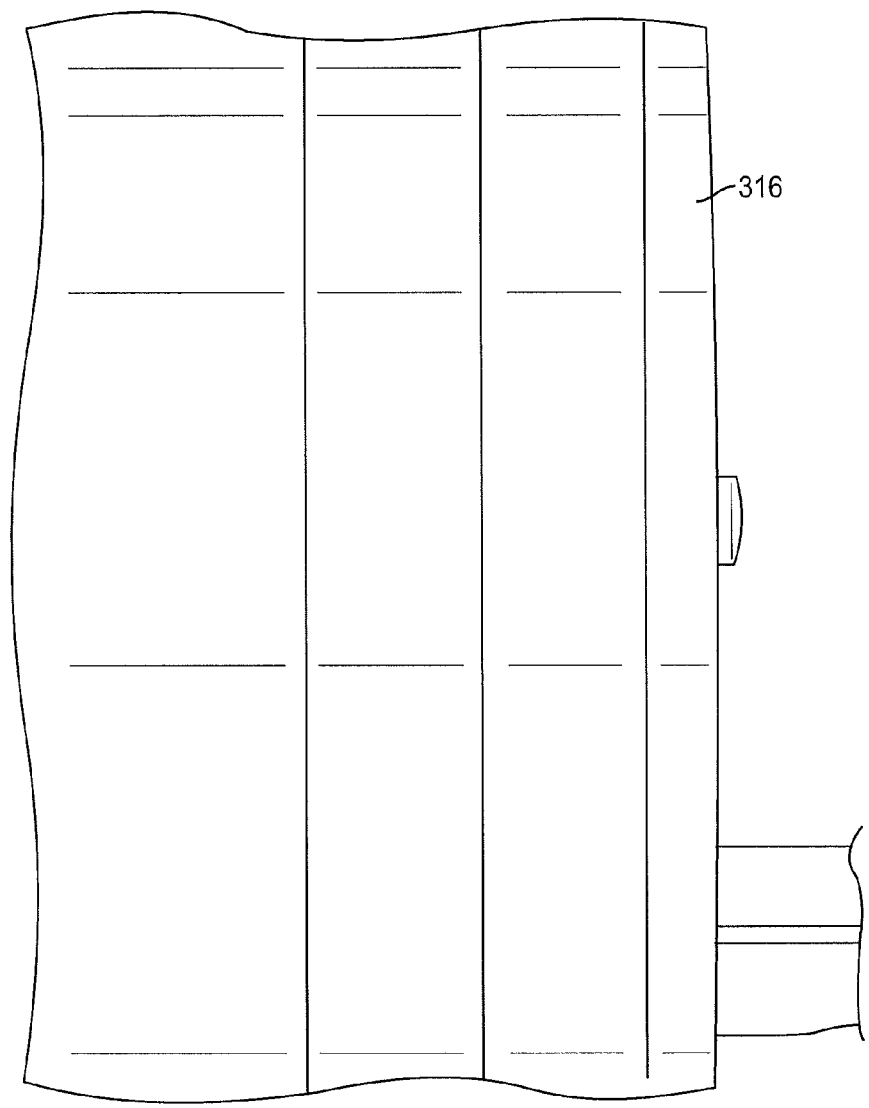

FIG. 25 depicts a side view of an overpressure wave generator 11 with a backhoe attachment apparatus 908 having been attached to a backhoe 902.

FIGS. 26-36 depict construction of components of an exemplary piston 316 in accordance with the embodiment of the invention shown in FIG. 3.

While particular embodiments of the invention have been described, it will be understood, however, that the invention is not limited thereto, since modifications may be made by those skilled in the art, particularly in light of the foregoing teachings.

The invention claimed is:

1. An overpressure wave generation system, comprising:
a detonator, comprising:
a detonator tube configured to receive a fuel-oxidant mixture that flows through said detonator tube; and
an igniter within the detonator tube for igniting said fuel-oxidant mixture while said fuel-oxidant mixture is flowing through said detonator tube to produce a detonation in said detonator tube;
a coupling chamber; and
an interface between said coupling chamber and a target media, said detonation generating an overpressure wave that travels out of said detonator tube and into said coupling chamber, said coupling chamber being substantially sealed when said overpressure wave is generated thereby containing a pressure produced by said overpressure wave, said interface converting said pressure into a force that produces a conducted acoustic wave in the target media.

2. The overpressure wave generation system of claim 1, further comprising:
a detonation tube between said detonator and said coupling chamber, said overpressure wave traveling out said first detonator tube, through said detonation tube and then into said coupling chamber.

3. The overpressure wave generation system of claim 2, wherein said detonation tube has a first diameter and said coupling chamber has a second diameter.

4. The overpressure wave generation system of claim 3, wherein said first diameter is greater than said second diameter.

5. The overpressure wave generation system of claim 3, wherein said first diameter is less than said second diameter.

6. The overpressure wave generation system of claim 1, wherein said interface comprises an earth plate.

7. The overpressure wave generation system of claim 6, said interface further comprising:
a cylinder, said cylinder being attached to said coupling chamber; and
a piston located inside said cylinder and positioned against said earth plate, said piston and said cylinder being configured to substantially provide a seal to contain said pressure.

8. The overpressure wave generation system of claim 6, said interface further comprising:
a flexible membrane providing a seal to contain said pressure; a top plate;

a movement constraining vessel having a lower inner flange; and a piston rod located inside said movement constraining vessel and positioned between said top plate and said earth plate, said overpressure wave applying a pressure to said flexible membrane that is converted into said force, said force being applied to said target media via said top plate, said piston rod, and said earth plate, said movement constraining vessel constraining movement such that the top plate can only move between said lower inner flange and said flexible membrane.

9. The overpressure wave generation system of claim 8, said movement constraining vessel having an upper inner flange, said movement constraining vessel constraining movement such that the top plate can only move between said lower inner flange and said upper inner flange.

10. The overpressure wave generation system of claim 1, wherein said coupling chamber is made of one of titanium, aluminum, or a composite material.

11. The overpressure wave generation system of claim 1, wherein said coupling chamber is made of steel.

12. The overpressure wave generation system of claim 1, wherein said coupling chamber has a round shape.

13. The overpressure wave generation system of claim 1, wherein said coupling chamber includes an outer flange.

14. The overpressure wave generation system of claim 7, wherein said cylinder includes an upper outer flange.

15. The overpressure wave generation system of claim 7, wherein said cylinder includes a lower outer flange.

16. The overpressure wave generation system of claim 14, further comprising a sealing component between the outer flange of the coupling chamber and the upper outer flange of the cylinder.

17. The overpressure wave generation system of claim 7, wherein said coupling chamber and said cylinder are a single component.

18. The overpressure wave generation system of claim 1, further comprising a vent pipe.

19. The overpressure wave generation system of claim 18, wherein said vent pipe has a nozzle.

20. The overpressure wave generation system of claim 18, wherein said vent pipe has a muffler.

21. The overpressure wave generation system of claim 18, wherein said vent pipe has a restrictor.

22. The overpressure wave generation system of claim 1, further comprising:

a vehicle for constraining movement of said overpressure wave generation system.

23. The overpressure wave generation system of claim 1, wherein said vehicle is attached to said overpressure wave generation system.

* * * * *